(12) United States Patent
Fuchs et al.

(10) Patent No.: US 9,660,441 B2
(45) Date of Patent: May 23, 2017

(54) OVERVOLTAGE PROTECTION FOR POWER SYSTEMS

(71) Applicant: Emprimus, LLC, St. Louis Park, MN (US)

(72) Inventors: Greg Fuchs, River Falls, WI (US); George Anderson, Champlin, MN (US); William M. Volna, Minneapolis, MN (US); Gale K. Nordling, Excelsior, MN (US); Wallace Jensen, Centerville, MN (US); David Blake Jackson, Excelsior, MN (US); Frederick R. Faxvog, Long Lake, MN (US); James Nicholas Ruehl, Excelsior, MN (US)

(73) Assignee: Emprimus, LLC, St. Louis Park, MN (US)

(*) Notice: Subject to any disclaimer, the term of this patent is extended or adjusted under 35 U.S.C. 154(b) by 92 days.

(21) Appl. No.: 14/185,458

(22) Filed: Feb. 20, 2014

(65) Prior Publication Data
US 2014/0334054 A1    Nov. 13, 2014

Related U.S. Application Data

(60) Provisional application No. 61/767,143, filed on Feb. 20, 2013, provisional application No. 61/817,762, (Continued)

(51) Int. Cl.
*H02H 9/06* (2006.01)
*H01T 2/02* (2006.01)
(Continued)

(52) U.S. Cl.
CPC ............... *H02H 9/06* (2013.01); *H01T 2/02* (2013.01); *H01T 4/06* (2013.01); *H01T 4/10* (2013.01); *H01T 4/14* (2013.01)

(58) Field of Classification Search
CPC .................................................... H02H 9/06
(Continued)

(56) References Cited

U.S. PATENT DOCUMENTS

| 2,282,905 | A | * | 5/1942 | Towne | H01T 4/10 |
| | | | | | 174/140 R |
| 3,715,614 | A | * | 2/1973 | Linkroum | H01T 2/02 |
| | | | | | 313/568 |

(Continued)

FOREIGN PATENT DOCUMENTS

| DE | 27 18 188 A1 | 10/1978 |
| DE | 39 10 435 A1 | 8/1990 |

(Continued)

OTHER PUBLICATIONS

International Search Report and Written Opinion for PCT/US2014/017161 mailed May 14, 2014.
(Continued)

*Primary Examiner* — Thienvu Tran
*Assistant Examiner* — Lucy Thomas
(74) *Attorney, Agent, or Firm* — Merchant & Gould P.C.

(57) ABSTRACT

Electrical protection devices, such as for use with power systems for overvoltage protection, are disclosed. One electrical protection device includes a first electrical connection, a second electrical connection, a first electrical discharge device, and a second electrical discharge device. The first electrical discharge device includes a first conductive bus connected to the first electrical connection and a second conductive bus connected to the second electrical connection. The first electrical discharge device has a first breakdown voltage. The second electrical discharge device includes a third conductive bus connected to the first electrical connection and a fourth conductive bus connected to
(Continued)

the second electrical connection. The second electrical discharge device has a second breakdown voltage.

19 Claims, 31 Drawing Sheets

Related U.S. Application Data filed on Apr. 30, 2013, provisional application No. 61/880,345, filed on Sep. 20, 2013.

(51) Int. Cl.
*H01T 4/06* (2006.01)
*H01T 4/10* (2006.01)
*H01T 4/14* (2006.01)

(58) Field of Classification Search
USPC .......................................... 361/112
See application file for complete search history.

(56) References Cited

U.S. PATENT DOCUMENTS

| 4,267,484 | A | * | 5/1981 | O'Loughlin | H01J 17/00 |
| | | | | | 313/156 |
| 4,665,460 | A | * | 5/1987 | Schaff | H01T 4/14 |
| | | | | | 174/6 |
| 6,384,374 | B1 | * | 5/2002 | Colling | B23K 9/0673 |
| | | | | | 219/130.4 |
| 8,878,396 | B2 | | 11/2014 | Faxvog et al. | |
| 2002/0149898 | A1 | * | 10/2002 | Durth | H01T 4/12 |
| | | | | | 361/120 |
| 2011/0102960 | A1 | * | 5/2011 | Podporkin | H01B 17/48 |
| | | | | | 361/137 |
| 2012/0019962 | A1 | * | 1/2012 | Faxvog | H02H 3/00 |
| | | | | | 361/1 |
| 2013/0038977 | A1 | * | 2/2013 | Lange | H01T 4/14 |
| | | | | | 361/112 |
| 2015/0311697 | A1 | | 10/2015 | Faxvog et al. | |

FOREIGN PATENT DOCUMENTS

| DE | 102 45 144 B3 | 1/2004 |
| DE | 10 2007 015 930 A1 | 7/2008 |
| GB | 14482 | 10/1916 |
| JP | 55-32655 | 3/1980 |
| WO | WO 2009/145249 A1 | 12/2009 |

OTHER PUBLICATIONS

Redlund, J. et al., "A New Fast Protective Device for High Voltage Series Capacitors," IEEE Power Engineering Society General Meeting, Montreal, Quebec, pp. 1-7 (2006).

* cited by examiner

Electrical Connection to Component to be Protected

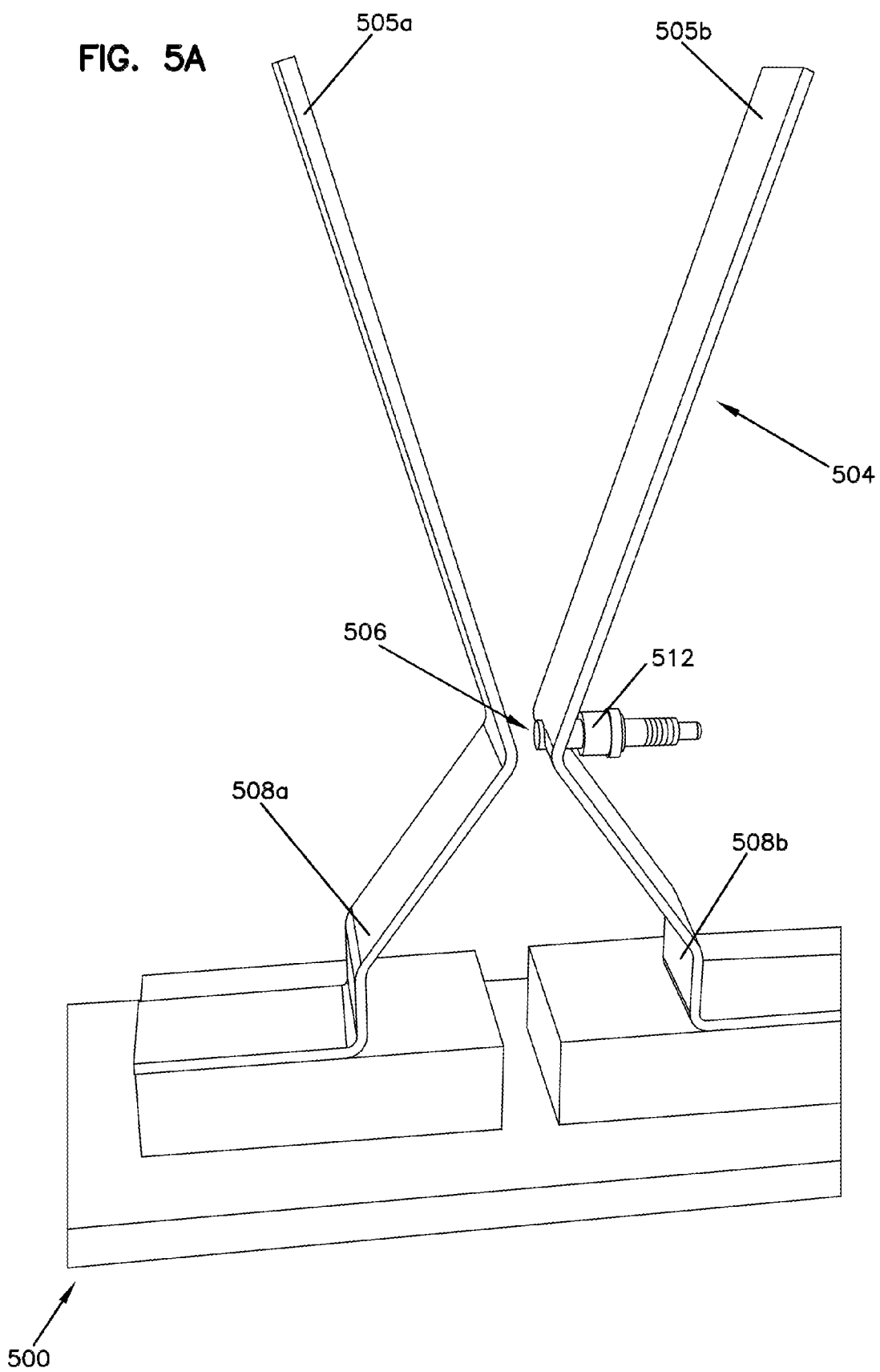

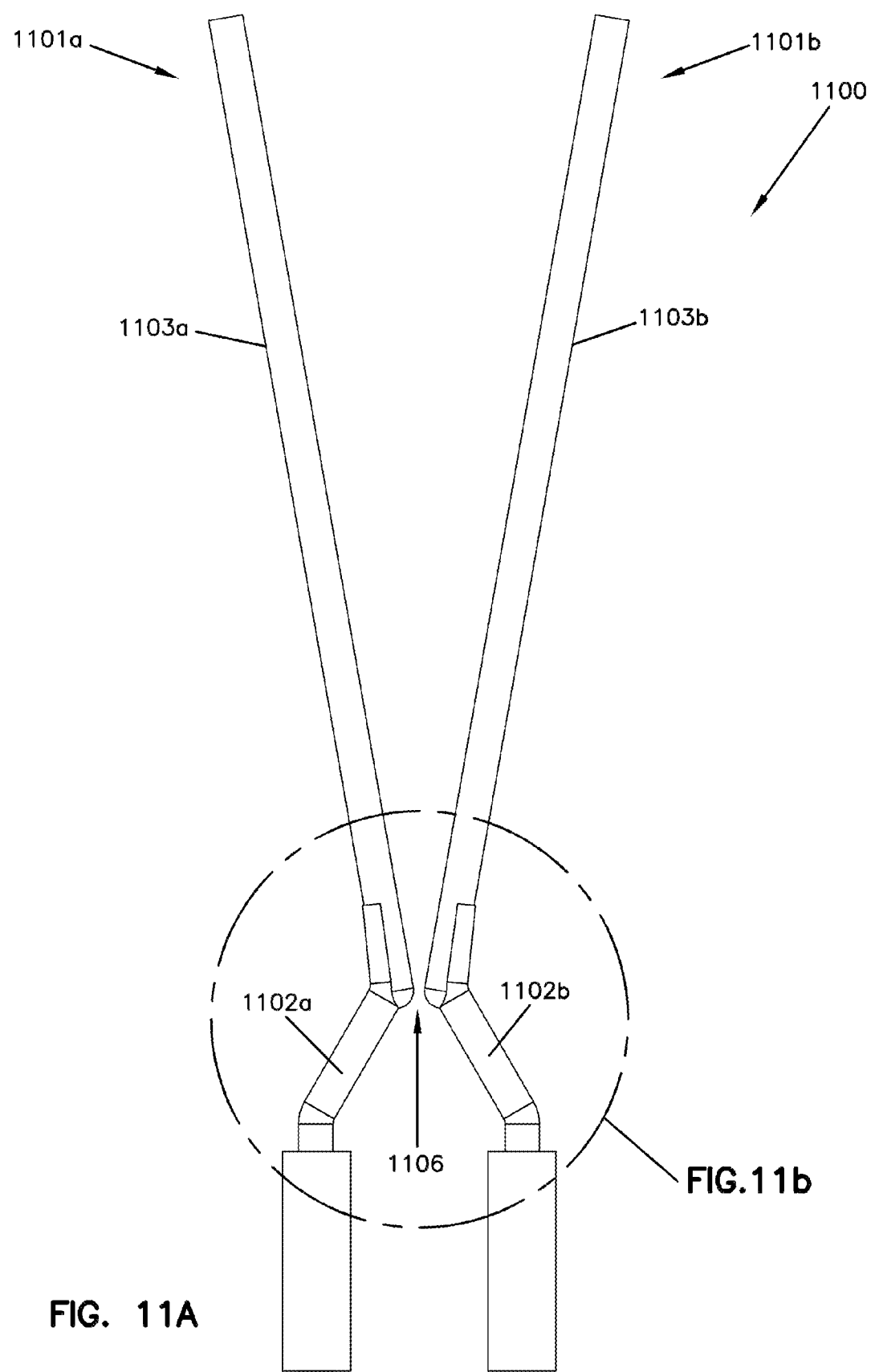

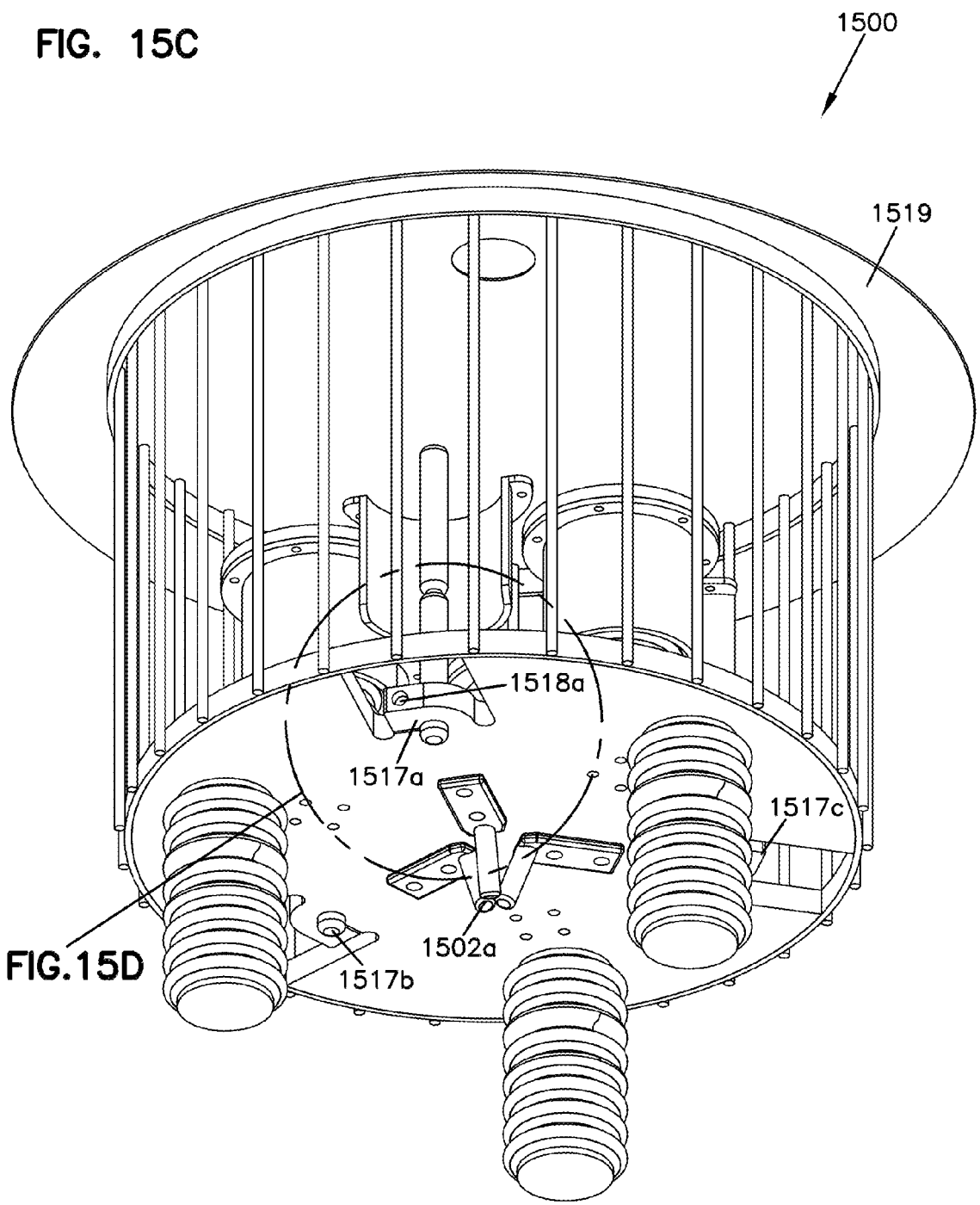

OVERVOLTAGE PROTECTION FOR POWER SYSTEMS

CROSS REFERENCE TO RELATED APPLICATIONS

This application claims priority from U.S. Provisional Patent Application Ser. No. 61/767,143, filed Feb. 20, 2013; U.S. Provisional Patent Application Ser. No. 61/817,762, filed Apr. 30, 2013; and U.S. Provisional Patent Application Ser. No. 61/880,345, filed Sep. 20, 2013; which are hereby incorporated by reference in their entireties.

TECHNICAL FIELD

The present application relates generally to power system features, and in particular to an overvoltage protection arrangement for power systems.

BACKGROUND

Traditionally, critical electrical systems are required to be protected against over voltages caused by faults in such electrical systems. These faults can generate much higher than normal currents and voltages across critical devices and can exceed their safe limit. For example, power systems, which correspond to an example of critical infrastructure, can experience ground faults, which result in high voltage signals being grounded, causing a current spike through equipment, and often causing damage to critical electrical equipment.

Systems have historically been developed that protect such systems during fault events. For example, in some cases, a spark gap was historically used to allow relief of overvoltage events, by allowing for a spark to form across an open air gap or in a non-combustible gas within a container to cause relief of voltage events that exceed a predetermined threshold. However, spark gaps are highly variable, and the voltage that causes such a spark to occur can vary by up to 10%-15% based on humidity and condensation or other environmental conditions. Furthermore, the total amount of energy that can be dispersed via the spark gap before the gap electrode material is destroyed by the energy of the electrical arc.

In more recent protection systems, surge arresters have been placed in parallel with power line transformers to protect during lightning strikes, ground faults, or other voltage and/or current spike conditions. In such circumstances, surge arresters provide voltage clipping at a first threshold, in which overvoltage events can be routed to ground without damaging electrical systems positioned in parallel with such surge arresters. The surge arresters have a limit to the amount of energy they can shunt to ground. If the event continues after that energy limit is exceeded, the surge arrester enters a pressure relief mode. In this event, the surge arrester is designed to safely carry the current to ground and to limit the voltage on the protected system (e.g. as described in IEEE C62.11) but is unusable afterwards.

Accordingly, the various systems and methods that have been used experience disadvantages in operation that render them, at times, to be suboptimal for reliable protection for electrical systems.

SUMMARY

In accordance with the following disclosure, the above and other issues are addressed by the following:

In a first aspect, an electrical protection device includes a first electrical connection, a second electrical connection, a first electrical discharge device, and a second electrical discharge device. The first electrical discharge device includes a first conductive bus connected to the first electrical connection and a second conductive bus connected to the second electrical connection, wherein the first electrical discharge device has a first breakdown voltage and wherein when a voltage differential between the first conductive bus and the second conductive bus exceeds the first breakdown voltage, a first electrical current passes between the first conductive bus and the second conductive bus. The second electrical discharge device includes a third conductive bus connected to the first electrical connection and a fourth conductive bus connected to the second electrical connection, wherein the second electrical discharge device has a second breakdown voltage and wherein when a voltage differential between the third conductive bus and the fourth conductive bus exceeds the second breakdown voltage, a second electrical current passes between the third conductive bus and the fourth conductive bus.

In a second aspect, an electrical protection device includes a first electrical connection, a second electrical connection, a first spark gap, and a second spark gap. The first spark gap is formed between a first electrode and a second electrode, the first electrode is connected to the first electrical connection and the second electrode is connected to the second electrical connection, wherein the first spark gap has a first breakdown voltage. The second spark gap is formed between a third electrode and a fourth electrode, the third electrode is connected to the first electrical connection and the fourth electrode is connected to the second electrical connection, wherein the second spark gap has a second breakdown voltage.

In a third aspect, an electrical protection device includes a first electrical connection, a second electrical connection, a first spark gap, a second spark gap, a third spark gap, an upper plate, a lower plate, and an insulating standoff. The first spark gap is formed between a first electrode and a second electrode, the first electrode is connected to the first electrical connection and the second electrode is connected to the second electrical connection, wherein the first spark gap has a first breakdown voltage. The second spark gap is formed between a third electrode and a fourth electrode, the third electrode is connected to the first electrical connection and the fourth electrode is connected to the second electrical connection, wherein the second spark gap has a second breakdown voltage. The third spark gap is formed between a fifth electrode and a sixth electrode, the fifth electrode is connected to the first electrical connection and the sixth electrode is connected to the second electrical connection, wherein the third spark gap has a third breakdown voltage. The upper plate formed from an electrically conductive material. The lower plate formed from an electrically conductive material. The insulating standoff is disposed between the upper plate and the lower plate. The first electrode, the third electrode, and the fifth electrode are oriented vertically and are mounted in the upper plate. The second electrode, the fourth electrode, and the sixth electrode are oriented vertically and mounted in the lower plate. The first electrode is separated from the second electrode by a first gap distance corresponding to the first breakdown voltage. The third electrode is separated from the fourth electrode by a second gap distance corresponding to the second breakdown voltage. The fifth electrode is separated from the sixth electrode by a third gap distance corresponding to the third breakdown voltage. The first electrical connection is connected to a grounding terminal, and the second electrical connection is connected to a power transmission line or to the neutral of a transformer for the protection of connected electrical equipment from an electrical ground fault current.

In a fourth aspect, an overvoltage protection system includes an overvoltage protection assembly and a self-test assembly. The overvoltage protection assembly includes a first electrical connection and a second electrical connection. It also includes a first electrical discharge device, including a first conductive bus connected to the first electrical connection and a second conductive bus connected to the second electrical connection, wherein the first electrical discharge device has a first breakdown voltage and wherein when a voltage differential between the first conductive bus and the second conductive bus exceeds the first breakdown voltage, a first electrical current passes between the first conductive bus and the second conductive bus. The overvoltage protection assembly also includes a second electrical discharge device, including a third conductive bus connected to the first electrical connection and a fourth conductive bus connected to the second electrical connection, wherein the second electrical discharge device has a second breakdown voltage and wherein when a voltage differential between the third conductive bus and the fourth conductive bus exceeds the second breakdown voltage, a second electrical current passes between the third conductive bus and the fourth conductive bus. The self-test assembly is electrically connected in parallel with the overvoltage protection assembly and useable to detect at least one of the first and second breakdown voltage between an electrical component and ground.

In another aspect, an electrical protection device includes a first electrical connection and a second electrical connection, and a surge arrester including a first side connected to the first electrical connection and a second side connected to the second electrical connection. The surge arrester has a breakdown voltage at which it begins to conduct and clipping occurs and a pressure relief voltage above which the surge arrester enters a pressure relief mode nearly instantaneously (here less than 10 s of microseconds). The electrical protection device includes a spark gap formed between first and second electrodes, the first electrode connected to the first electrical connection and the second electrode connected to the second electrical connection, wherein the spark gap has a first side and a second side, the distance between the first side and the second side selected such that a breakdown voltage of the spark gap is greater than the conduction voltage and less than the voltage withstand limit of the connected electrical equipment. The electrical protection device further includes a first conductor including a first end and a second end, the first end connected to the first side of the spark gap, and a second conductor, including a first end and a second end, the first end connected to the second side of the spark gap. The distance between the second end of the first conductor and the second end of the second conductor is greater than the distance between the first end of the first conductor and the first end of the second conductor. The surge arrester and the spark gap are thus electrically connected in a parallel configuration.

In yet another aspect, an electrical protection device includes first and second electrical connections and a surge arrester, including a first side connected to the first electrical connection and a second side connected to the second electrical connection. The electrical protection device includes a pair of arcing horns (or Jacob's ladder) formed from a conducting material, the first arcing horn in the pair connected to the first electrical connection, the second arcing horn in the pair connected to the second electrical connection. The distance between the middle of the first arcing horn and the middle of the second arcing horn (or Jacob's ladder) forms a spark gap with a breakdown voltage that is greater than the conduction voltage of the surge arrester and less than the voltage withstand limit of the connected electrical equipment. The surge arrester and the arcing horns are thus electrically connected in a parallel configuration.

In a further aspect, an electrical protection device includes a first electrical connection, a second electrical connection, and a surge arrester. The surge arrester includes a first side connected to the first electrical connection and a second side connected to the second electrical connection, the surge arrester having a breakdown voltage at which clipping occurs. The device further includes a spark gap formed by a pair of concentric cylindrical conductors spaced apart by a predetermined distance. The spark gap has a breakdown voltage that is greater than the conduction voltage of the surge arrester and less than the voltage withstand limit of the connected electrical equipment.

BRIEF DESCRIPTION OF THE DRAWINGS

FIG. 5A is a perspective view of an overvoltage protection assembly including an integrated Gabriel, according to a further example embodiment;

FIG. 11A is a perspective view of an embodiment of the electrodes in an overvoltage protection assembly;

FIG. 15C is a perspective view from below of the overvoltage protection assembly of FIG. 15A;

DETAILED DESCRIPTION

Figure 1:
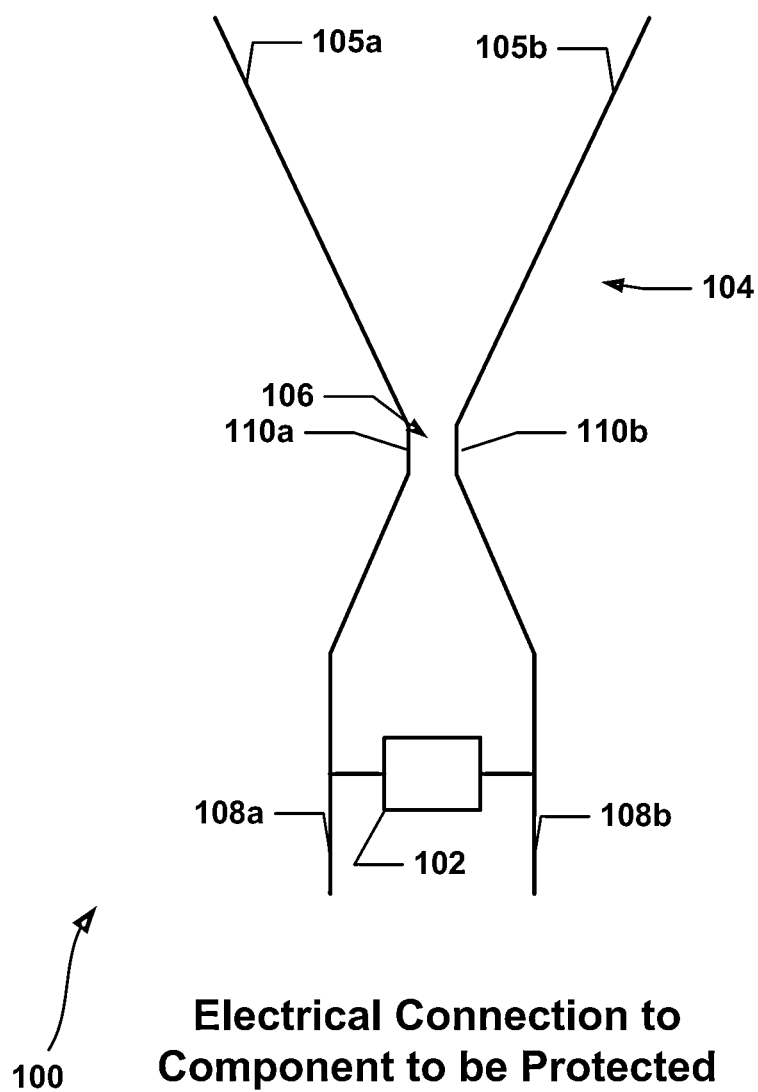
FIG. 1 is a schematic view of an overvoltage protection assembly.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general the present disclosure relates to a protective device for other electrical components, such as a capacitor bank or other electrical system, from ground fault voltage surges in power systems. Embodiments of the systems and methods of the present disclosure incorporates the integration of a surge arrester, spark gap, and a Jacob's ladder (or arcing horns) such that the gap distance and the surge arrester electrical characteristics are selected to give reliable protection at a given voltage level. Still other embodiments of the electrical protection systems described herein employ spark gap configurations that provide overvoltage protection of electrical systems, and in particular for use in large scale power systems (e.g. power transmission systems) that require relatively large power and current dissipation amounts, while remaining cost-effective for use in power transmission networks. Such embodiments can include features which are tailored for use in protection against induced currents experienced on a neutral of a power line transformer, and are configured to provide a relatively low-cost configuration which also can accommodate such large current dissipation events as may occur in a power grid.

Figure 2:
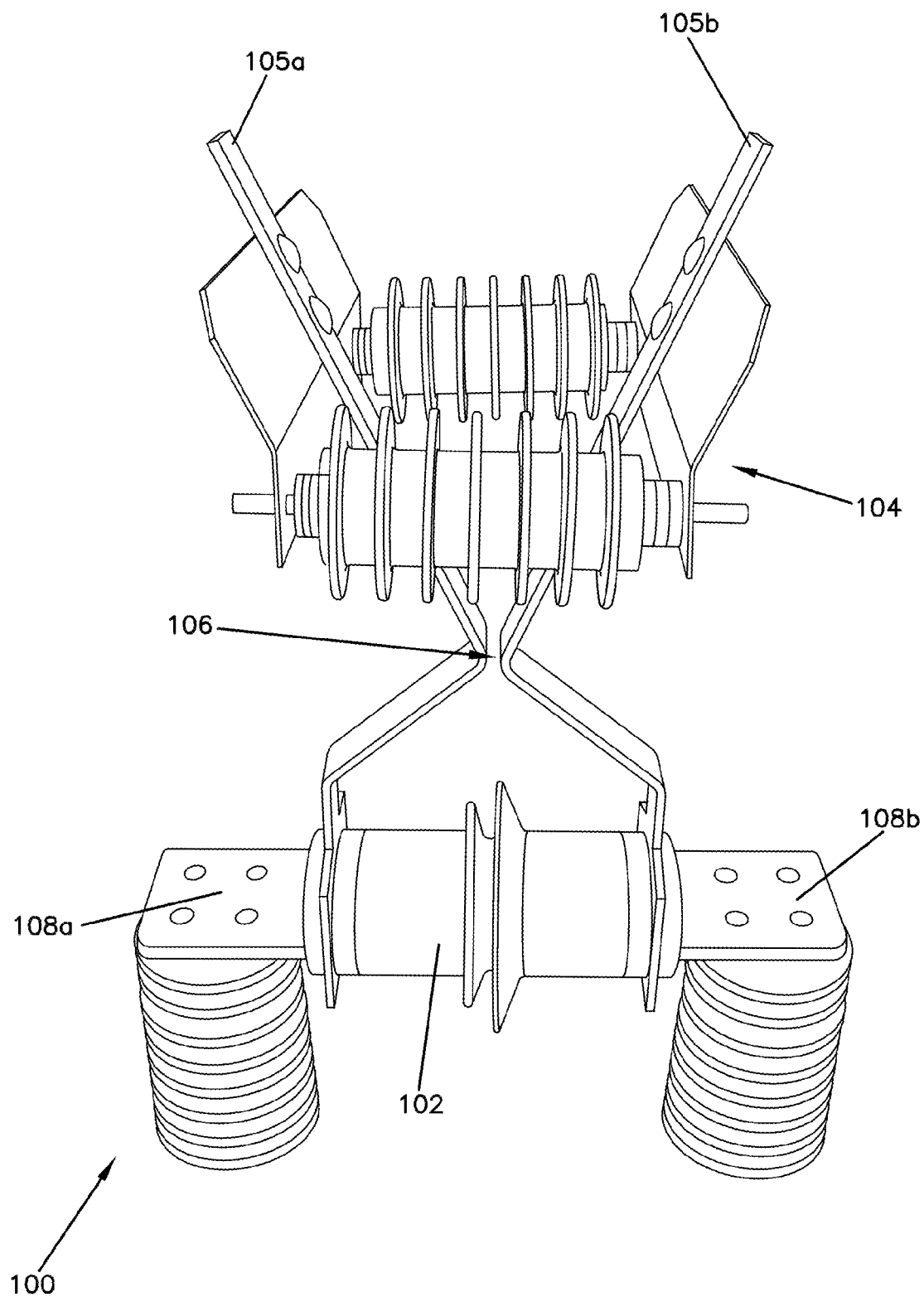
FIG. 2 is a perspective view of an overvoltage protection assembly, according to a first alternative example embodiment.

Referring now to FIGS. 1-2, an assembly 100 is shown that is configured to provide protection to a high power electrical component, such as a capacitor bank or other power system component, from high voltage during ground fault events, according to example embodiments. The assembly includes a surge arrester 102, a Jacob's ladder (or arcing horns) 104, and a spark gap 106 integrated therein, and connected in parallel with one another across circuit leads 108a-b, which connect to the component to be protected.

In the embodiment shown, the surge arrester 102 can take many forms. In an example embodiment, the surge arrester 102 is a metal oxide varistor (MOV) surge arrester. It can be located in a variety of locations; in the example of FIG. 2, the surge arrester 102 is mounted at the base of the assembly. The surge arrester 102 clips any resonant or other voltages that might appear across a capacitor or capacitor bank or a series combination of a capacitor and resistor, thereby providing voltage clipping and resulting dampening for any unwanted series, ferro, or other resonances. In the embodiment shown, the surge arrester 102 is electrically connected at opposing sides to first and second electrical connections, at circuit leads 108a-b.

Attached to the surge arrester is a combination Jacob's ladder (or arcing horns) 104 with a spark gap 106. The Jacob's ladder 104 includes first and second conductors 105a-b, between which the spark gap is formed, and in which the distance between the top end of the first electrode and the top end of the second electrode is greater than the distance between the bottom end of the first electrode and the bottom end of the second electrode. The first and second conductors 105a-b can be constructed from, in various embodiments, brass, nickel coated copper, tungsten, niobium, alloys thereof, or other types of highly conductive materials.

The spark gap 106 is, in the embodiment shown in FIG. 2, a narrow gap between the two conductors 105a-b of a narrow section of the Jacob's ladder 104, forming electrodes 110a-b. The spark gap 106 has, in the embodiment shown, a few millimeter gap distance, and is built into the Jacob's ladder 104. When a high current ground fault is experienced, an arc will form at the spark gap 106 to limit the voltage across the component to be protected (i.e. a capacitor or capacitor bank or other component, connected at leads 108a-b).

The Jacob's ladder 104 includes complementary metal structures forming a gap of increasing distance extending away from the spark gap 106. The Jacob's ladder 104 is, in example embodiments, constructed of a suitable conducting metal such as brass, nickel coated copper, tungsten, niobium, alloys thereof, or other suitable metal, and provides a means for the arc to travel away from the spark gap 106 (e.g., up the ladder) where it can dissipate large amounts of energy to the air.

In some embodiments, the gap separation on the Jacob's ladder 104, and hence the breakdown voltage, is designed to be a fixed distance to achieve a fixed breakdown voltage in air. In alternative embodiments, the gap could be adjustable, and hence the breakdown voltage of the gap could be adjustable. The relationship between the breakdown voltage and gap spacing for various gases is given by Paschen's Law, which describes a breakdown voltage of gas between parallel plates as a function of pressure and gap distance.

During operation, and upon occurrence of an overvoltage event, typically the initial arc after forming at the spark gap 106 will rapidly climb the Jacob's ladder 104 and then continue to arc across the tips of the ladder for several power cycles, typically a few (4-6) power cycles at 60 Hz (i.e. 60 to 100 milliseconds). During this arc energy dissipation phase, some of the tips of the Jacob's ladder 104 will experience heating and a small amount of the metal electrode tips could be vaporized.

The surge arrester provides voltage clipping and in turn dampening of any unwanted resonances which might be encountered. If the surge arrester's energy absorption limit is exceeded, the spark gap remains to protect connected equipment from further overvoltage events. A Jacob's ladder is also connected in parallel with the surge arrester and the spark gap. The Jacob's ladder function is to protect the surge arrester and spark gap once an arc conduction path has been established. That is, the arc when initiated at the gap will rapidly rise to the top of the ladder where the arc energy is dissipated into the air. In this way the combination of the surge arrester, spark gap and the Jacob's ladder provide an extremely reliable device for high power components such as capacitor banks, static VAR compensators (SVCs), or other high power electrical system components.

Figure 3:
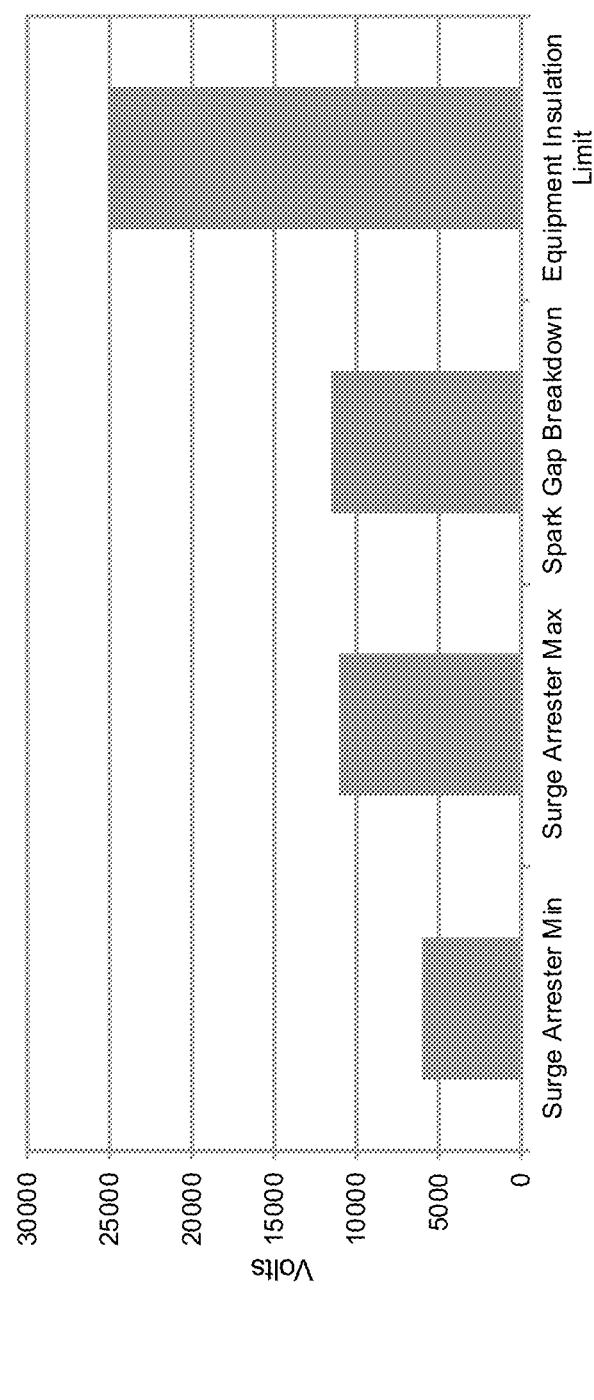
FIG. 3 illustrates example voltage levels depicting a design of the overvoltage protection assemblies discussed herein, in some example embodiments.

FIG. 3 illustrates an example voltage level diagram 300 depicting a design of the overvoltage protection assemblies discussed herein, in some example embodiments. In the diagram 300 as shown, operation of the protection assemblies illustrated above, as well as those in FIGS. 4-5 below, are described. In particular, one application of this protection assembly is the protection of a capacitor bank used for blocking Geomagnetically Induced Current (GIC) in the neutral of a grounded transformer, SVC or other power component.

As seen in the diagram 300 of FIG. 3, when ground fault voltages are encountered, the surge arrester 102 in an example assembly will conduct current and will perform a voltage clipping function for example in the 5 kV to 7 kV range. This provides damping to control unwanted resonances that may appear in a power system. If the amount of energy being shunted to ground by the surge arrester exceeds its functional limit, it will enter pressure relief and be consumed. In subsequent fault events, if the voltage exceeds the breakdown voltage of the spark gap (e.g., above the 11 kV range), an arc will form at the spark gap. In this case, the gap distance would be selected such that the arc would form for example at a nominal voltage on the order of 11 kV to 25 kV. It has been established that this breakdown voltage is dependent on humidity, condensation, atmospheric pressure variations, etc. However, variations over humidity, condensation, and pressure conditions will not greatly affect the breakdown voltage in the spark gap 106; rather, a variation in breakdown voltage will be relatively small (i.e. on the order of +/−10% to 15%), and is tolerable for this protection application. In alternative embodiments, additional surge arresters having different characteristics could be incorporated, such that each surge arrester may be configured to enter a pressure relief mode at the same level, or different levels.

Figure 4:
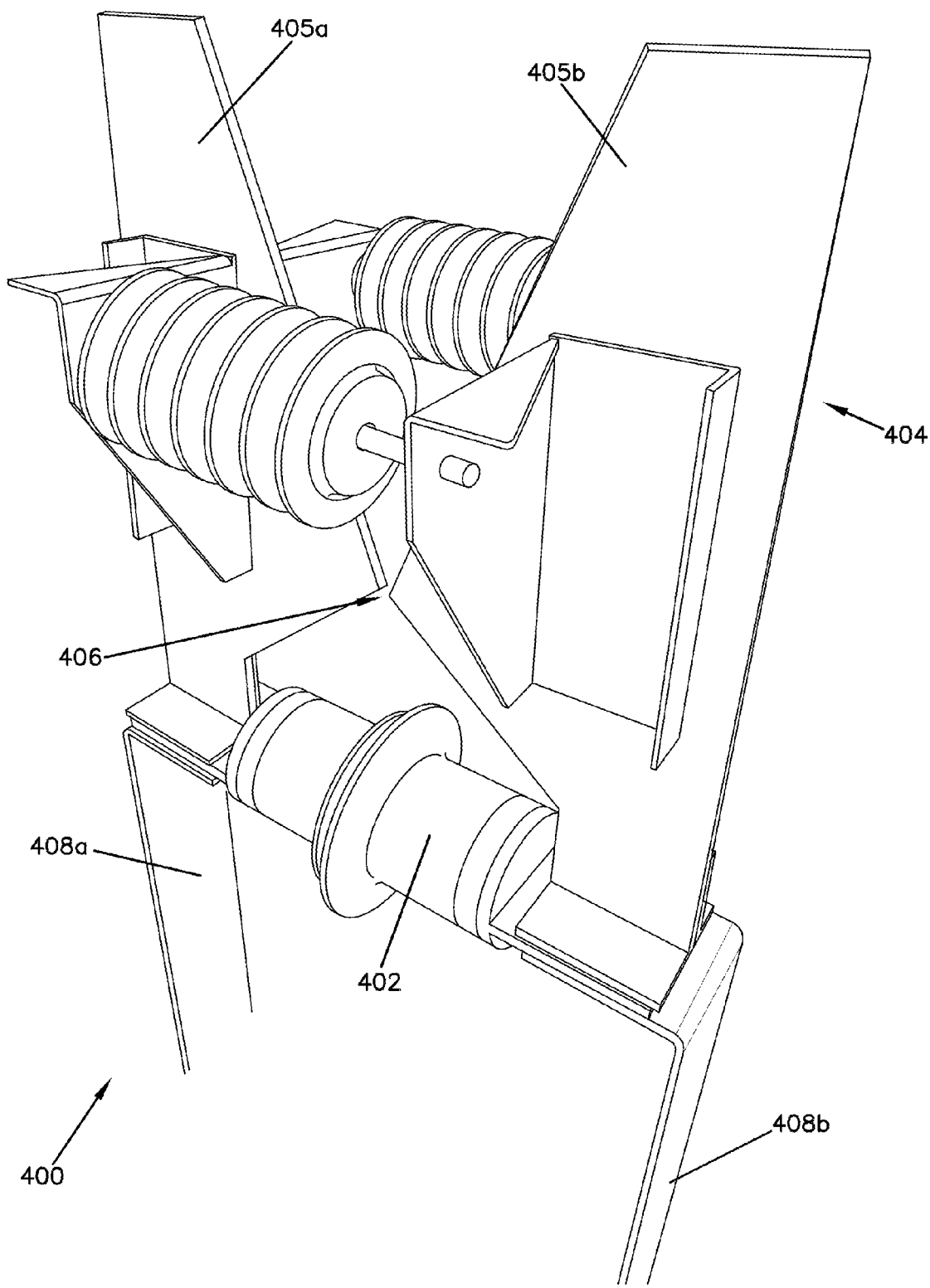
FIG. 4 is a perspective view of an overvoltage protection assembly, according to a second example embodiment.

FIG. 4 is a perspective view of an overvoltage protection assembly 400, according to a second example embodiment. The assembly 400 includes a surge arrester 402, as well as a Jacob's ladder 404 and spark gap 406, analogous to those described above. In this example embodiment, the assembly 400 is configured using a "blade" configuration of the Jacob's ladder 404 that is designed to provide increased mechanical stability to the Jacob's ladder 404 and a hence a more stable spark gap distance (i.e. a more consistent gap breakdown voltage). The assembly 400 as shown includes the surge arrester 402 (e.g., the MOV) mounted horizontally at the bottom of the assembly. Conductors 405a-b of the Jacob's ladder 404 are electrically connected in parallel with the surge arrester 402, and extend vertically. If the surge arrester's current carrying ability is exceeded, it will enter the pressure relief mode and an electrical arc will form. Subsequent overvoltage events would create an arc at the spark gap if the voltage differential reaches the gaps preset breakdown voltage. In either case, the arc energy is then dissipated at the tips of the Jacob's ladder 404 reducing the amount of damage to the surge arrester 402 and material of conductors 405a-b that define the gap dimensions and therefore the breakdown voltage of the spark gap. The assembly 400 is configured to be connected to the component to be protected at circuit leads 408a-b.

Figure 5B:
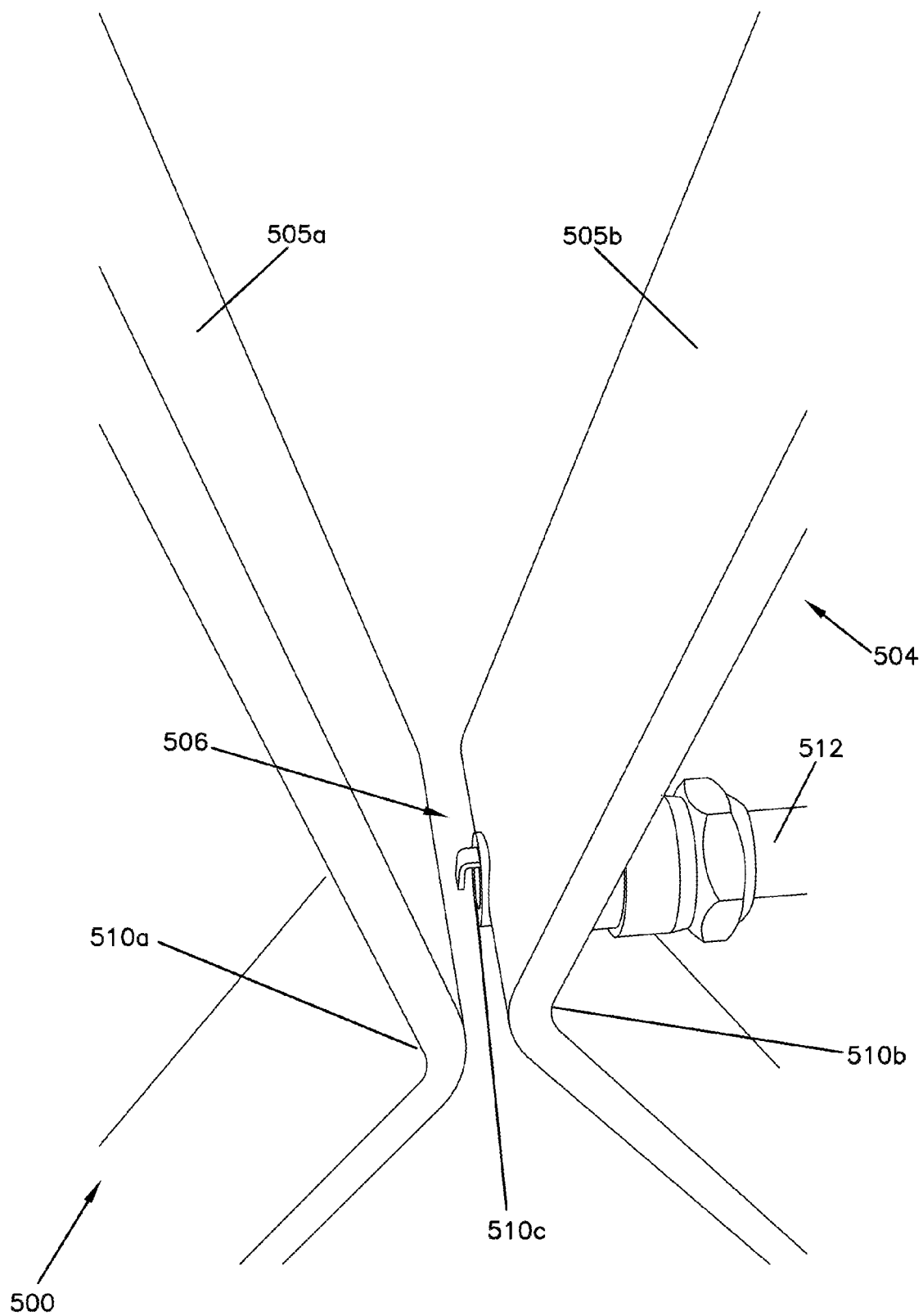
FIG. 5B is a close up perspective view of a portion of the overvoltage protection assembly of FIG. 5A.

Now referring to FIGS. 5A-5B, a further example protective assembly 500 is shown that includes an integrated "Gabriel" configuration. In this embodiment, the assembly again includes a surge arrester (not shown), Jacob's ladder 504, and spark gap 506. However, in the embodiment shown, the spark gap 506 includes a Gabriel electrode 510c in addition to the existing electrodes 510a-b. This provides a more reliable breakdown voltage of the gap. In the embodiment shown the third electrode 510c is implemented by including in this example a spark plug 512 at the spark gap 506, with the tip of this third electrode (in this example a spark plug) positioned in the spark gap 506. This electrode 510c is connected electrically to the high voltage ladder electrode 510b through a series resistor (not shown, but typically on the order of a few mega ohms resistance). The function of electrode 510c is to initiate an ionized column of gas at a more precise voltage level to start the formation of the arc in the gap. The resistor then limits the current through this electrode so that the arc current is carried through the first and second electrodes of the Jacob's ladder or arcing horns. The third electrode 510c thereby provides a smaller range of voltages over which the spark gap fires and the assembly enters its protection mode. The assembly 500 is configured to be connected to the component to be protected at circuit leads 508a-b.

Figure 6:
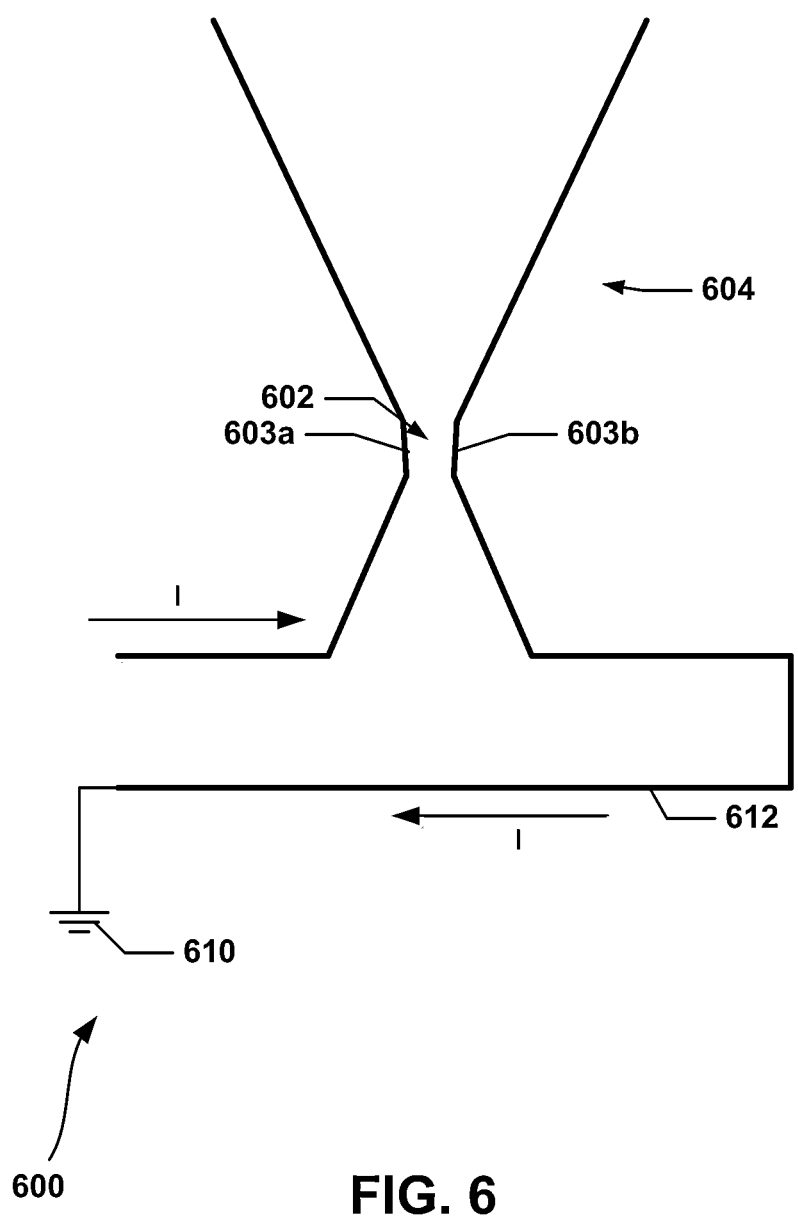
FIG. 6 is a schematic view of an overvoltage protection assembly, according to a further example embodiment.

Referring now to FIG. 6, a further embodiment of an overvoltage protection assembly 600 is shown. In the embodiment shown, a spark gap 602 is used for ground fault protection for high voltage (HV) and extra high voltage (EHV) power equipment. In the embodiment shown, a Jacob's ladder 604 can be used in connection with the spark gap 602 to create a protection device which has a long life and allows reuse for many (e.g., about 100 to 1,000) ground fault events. The spark gap 602 includes electrodes 603a-b, positioned at a predetermined distance from one another.

The overvoltage protection assembly 600 of FIG. 6, as with the other embodiments discussed herein, overcomes a problem with many spark gaps when used in high voltage, high current situations, in that the high current arc melts and destroys the metal in the area of the gap unless a special geometry and materials are used in the device. In an example embodiment as shown in FIG. 6, this destructive situation can be overcome using a Jacob's ladder 604 associated with the spark gap 602, and which will move the arc out of the initial gap area to allow energy dissipation over a larger volume and at the tip of the ladder electrodes. By this means, an overvoltage protection assembly, such as overvoltage protection assembly 600, can be designed that will not degrade but instead be re-useable for many ground faults.

Additionally, it is noted that the overvoltage protection assembly 600 further encourages any spark formed at the spark gap 602 to quickly move up the Jacob's ladder by applying a Lorentz force from the return conductor (612) located below the region of the arc. One side of the assembly is connected to the hot side of the electrical device that is to be protected. The second side of the spark gap is grounded at a grounding point 610. A conductive bar 612 or other electrical bus can be connected to the grounded return path side of the spark gap 602 and positioned below the spark gap 602.

In operation, a Lorentz force occurs between the conductive path on the positive side of the spark gap and Jacob's ladder assembly (at the first side of the spark gap 602) and the return path side of the spark gap 602, which repels the arc plasma and thereby pushes the arc up the Jacob's ladder 604. In the embodiment shown, a gap distance between the two electrodes is selected such that the required breakdown voltage can be achieved. This distance can be calculated using a Paschen's law relationship, expressed as a relationship between the breakdown voltage, the gas in the spark gap (i.e., air), the pressure experienced, and the distance of the spark gap.

Figure 7:
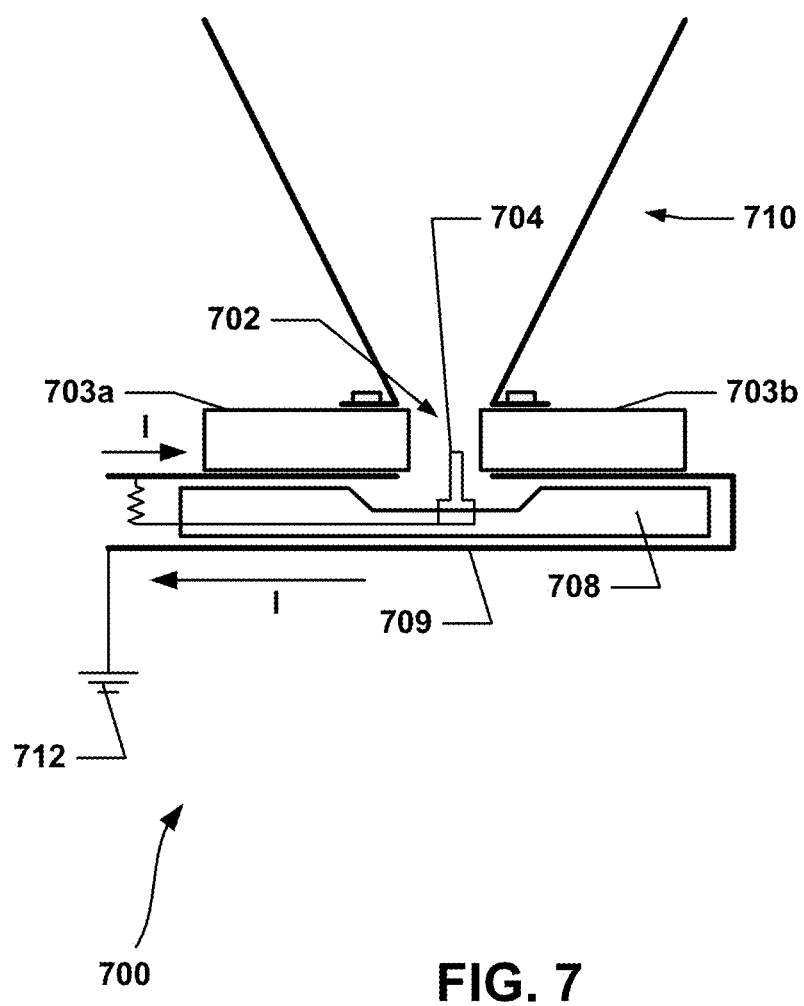
FIG. 7 is a schematic view of an overvoltage protection assembly, according to a further example embodiment.

In a further embodiment of the present disclosure illustrated in FIG. 7, overvoltage protection assembly 700 is shown. In this embodiment, a spark gap 702 can include electrodes 703a-b, and can be introduced into the arrangement illustrated in FIG. 6 by way of a Gabriel electrode 704. In this embodiment, a current conduction path is similar to that shown in FIG. 6; however, in the overvoltage protection assembly 700, the width of the spark gap 702 can be wider. For example, in some embodiments, the spark gap 702 can have a width of about 6 to 10 millimeters. In this configuration, an initial spark occurs between the third electrode 704 and the ground electrode 703b. A typical gap distance between this third electrode and the electrode 703b can be on the order of about 1 to 4 millimeters depending on the required breakdown voltage. The current in the initial spark is limited by a resistor 706 connected to this third electrode 704. Once a spark is initiated, a high current arc will be established between the high voltage electrode 703a and the ground electrode 703b. The larger gap size, typically 6 to 20 millimeters, allows for better arc energy dissipation over a larger volume and hence less chance for melting and destruction of the electrodes. The third electrode 704 can be, in various embodiments, made of tungsten or niobium or other high melting point metal to reduce wear occurring on this electrode. Additionally, in some embodiments the third electrode can be mounted securely in an insulating material 708 located under the gap area but above the lower electrical bus 709 (i.e. conductor), which is electrically connected to a grounding point 712.

In some embodiments, additionally the spark gap electrodes 703a-b can be constructed of tungsten to decrease the melting and/or destructive effect of a high current event on an electrode. This can be accomplished by using either two blocks of tungsten to which a Jacob's ladder 710 is attached as shown in FIG. 7, or alternatively by using tungsten horns for the entire assembly of the Jacob's ladder 710. In still other embodiments, other partial portions of the spark gap 702 and/or Jacob's ladder 710 can be made from tungsten or equivalent resilient conductive material.

Figure 8:
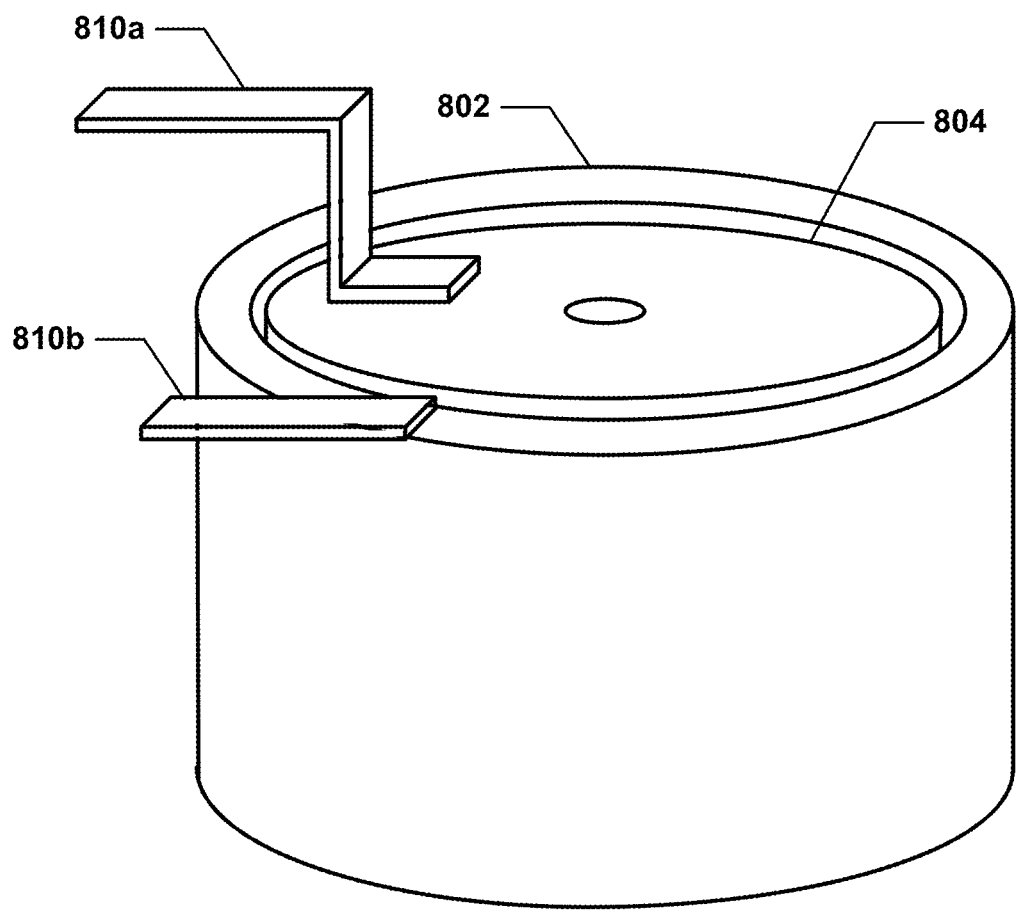
FIG. 8 is a schematic view of a cylindrical spark gap assembly, according to a further example embodiment.
Figure 9:
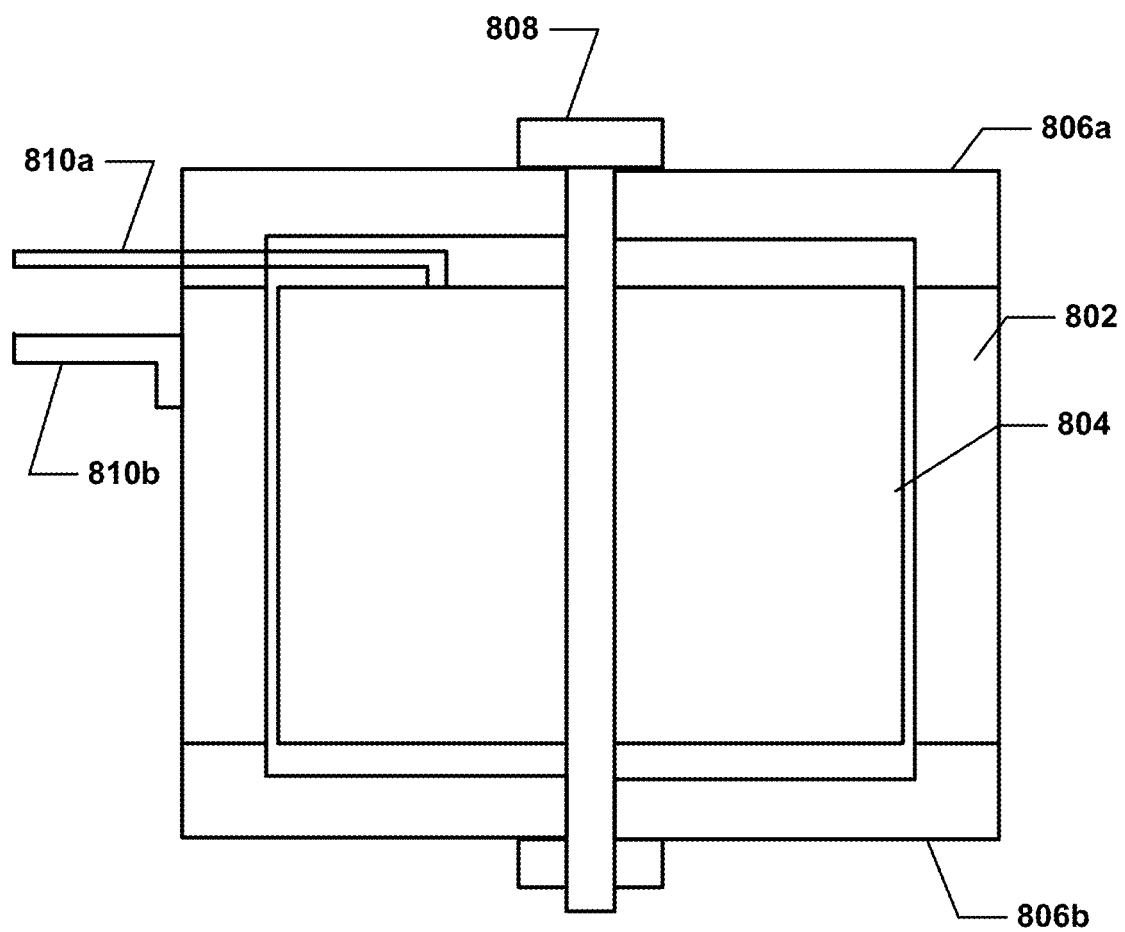
FIG. 9 is a cross-sectional schematic view of a cylindrical spark gap assembly, according to a further example embodiment.

An example cylindrical spark gap assembly 800 is illustrated in FIGS. 8-9. In this embodiment, two concentric metallic cylinders 802, 804 create a large area spark gap to achieve a long life ground fault protection device. In this embodiment, an arc is allowed to move around to the region of the smallest gap distance. Should metal ablation or melting occur the gap size in the region will increase. Hence, the arc will move to a different location within the device. A large spark gap area can be created by increasing the diameter and height of the cylinders shown in FIG. 8. Electrical leads 810a-b can connect to the overvoltage protection assembly 800, for example for grounding or connecting to the electrical network to be protected, as in FIGS. 7-8.

FIG. 9 shows details of the cylindrical spark gap assembly 800 in cross-sectional form. In particular, the details illustrated in FIG. 9 illustrate mounting the cylindrical spark gap assembly 800 including two concentric metallic cylinders 802, 804. An insulating material can be used to form top and bottom housing pieces 806a-b. Using a bolt 808 or other fastener, the center electrode cylinder can be secured relative to the outer electrode cylinder. Using the bolt 808 and associated cylinder shells, a uniform gap distance can be maintained between the two electrodes.

Figure 10A:
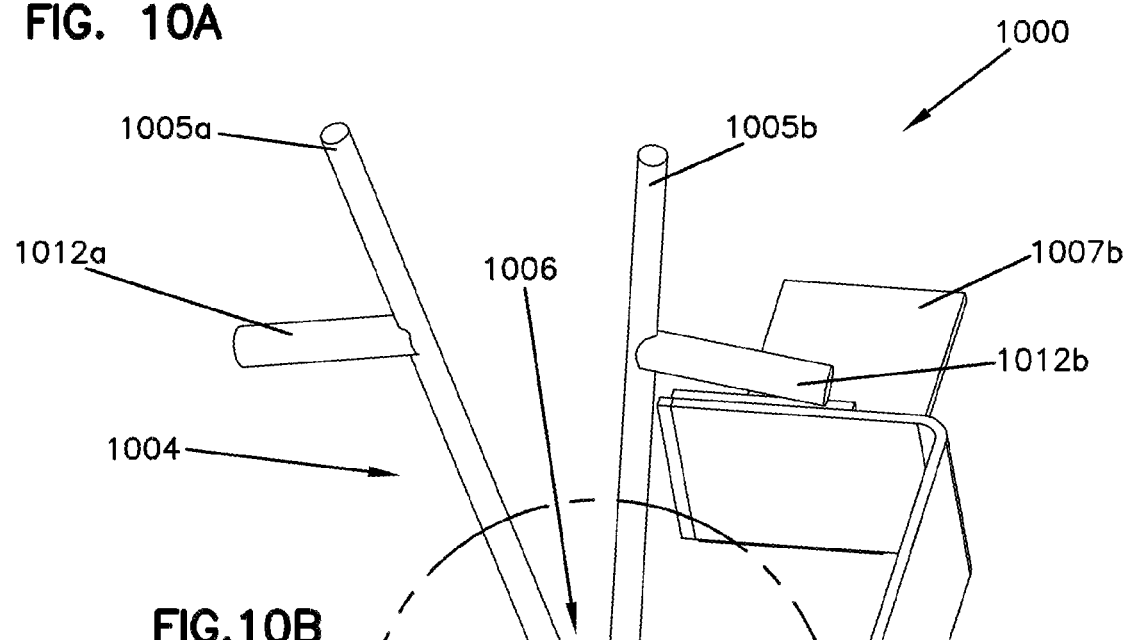
FIG. 10A is a perspective view of an overvoltage protection assembly according to a further example embodiment.
Figure 10A:
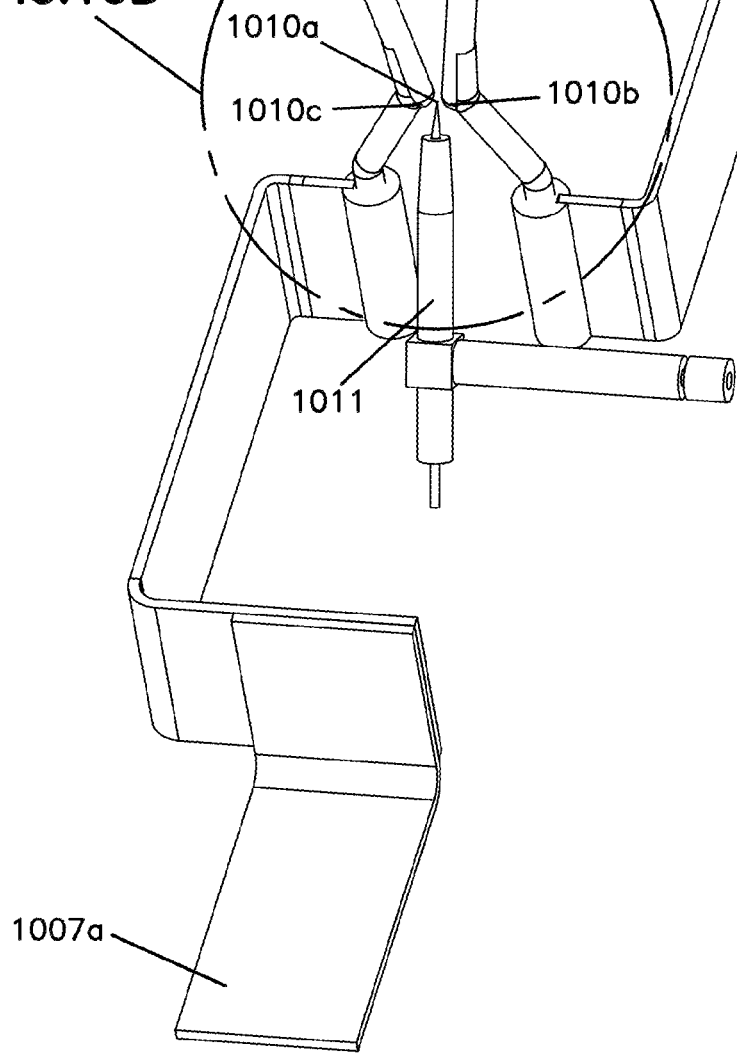

FIG. 10A is a perspective view of an overvoltage protection assembly 1000 according to another example embodiment. The assembly 1000 includes a Jacob's ladder 1004, a spark gap 1006, and standoffs 1012a-b.

In the embodiment shown, the Jacob's ladder 1004 includes conductors 1005a-b having electrodes 1010a-b (shown more clearly in conjunction with the embodiment described below in connection with FIG. 10C) and is configured to carry an arc that forms in the spark gap 1006 along the conductors 1005a-b where large amounts of arc energy can be dissipated into the air. The conductors 1005a-b are generally vertically disposed and, in some embodiments, have a cylindrical shape. The conductors 1005a-b are angled such that the distance between the middle of the conductors 1005a-b is less than the distance between the tops or the bottoms of the conductors 1005a-b. The spark gap 1006 is formed between the conductors 1005a-b at the point where the electrodes are closest together. Below the spark gap 1006, the distance between the conductors 1005a-b is widened sufficiently to prevent the arc from travelling down, or towards the equipment being protected. As described above, the spacing of the spark gap 1006 is selected using Paschen's Law to achieve a desired break down voltage. For example, in an embodiment configured to achieve a break down voltage of 10,000 volts in nitrogen at atmospheric pressure, the width of the spark gap 1006 is 2.3 mm.

In the embodiment shown, the current in the conductors 1005a-b just below the spark gap 1006 provides the Lorentz force on the arc formed in the spark gap 1006 and causes the arc to travel along the conductors 1005a-b. In some embodiments, the current moving up conductors 1005a, through the arc (i.e., across the spark gap 1006), and then down the conductors 1005b gives rise to a magnetic field in the area of the spark gap 1006. This magnetic field interacts with the current in the arc to give rise to the Lorentz force on the arc plasma, which pushes the arc up the conductors 1005a-b.

In some embodiments, the conductors 1005a-b are coupled to standoffs 1012a-b. The standoffs 1012a-b are formed from a rigid, insulating material and are configured to ensure that the electrodes do not move while the arc is present. In some embodiments, the standoffs 1012a-b are additionally coupled to another rigid external structure.

The conductors 1005a-b are connected to conducting buses 1007a-b. In some embodiments, the Jacob's ladder 1004 is connected in parallel to the equipment that is to be protected. In some embodiments, one of conductors 1005a-b is connected to the hot side of the electrical device that is to be protected and the other is connected to ground.

In some embodiments, the overvoltage protection assembly 1000 additionally includes a Gabriel electrode 1010c. Other embodiments do not include a Gabriel electrode 1010c.

Figure 10B:
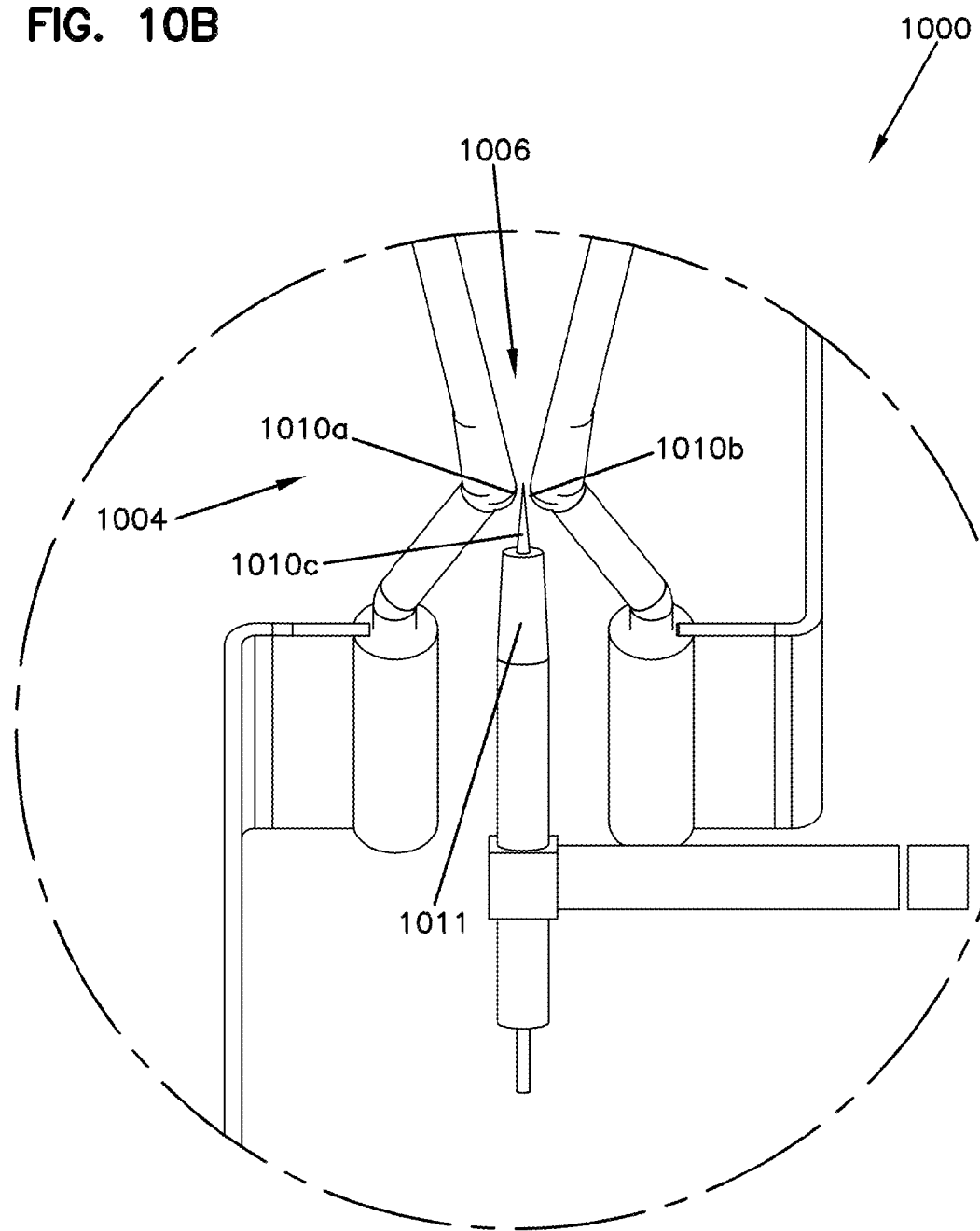
FIG. 10B is a close-up, perspective view of a portion of the overvoltage protection assembly of FIG. 10A.

Now referring to FIG. 10B, a close-up, perspective view of overvoltage protective assembly 1000 is shown. In the embodiment shown, overvoltage protective assembly 1000 includes as an integrated "Gabriel" electrode 1010c.

In the embodiment shown in FIGS. 10A-B, a Gabriel electrode 1010c is disposed in the spark gap 1006 between electrodes 1010a-b. In some embodiments, the Gabriel electrode 1010c is an electrical conducting point that is much smaller than electrodes 1010a-b. The Gabriel electrode 1010c is configured to initiate the arc at a controlled voltage. The Gabriel electrode 1010c allows for the initiation of the arc at a reasonably low breakdown voltage and allows for a larger gap so as to withstand the energy dissipation of a high-current arc. In some embodiments, the Gabriel electrode 1010c is disposed and rigidly held at a position that is closer to electrode 1010a than electrode 1010b. In these embodiments, the initiation of the arc across the spark gap 1006 is dependent on the distance between the tips of electrode 1010a and Gabriel electrode 1010c. Further, in these embodiments, the initiation of the arc across spark gap 1006 is less dependent on the distance between electrode 1010a and electrode 1010b. Accordingly, embodiments that include Gabriel electrode 1010c have greater tolerance for environmental, material, and fabrication variances.

In the embodiment shown, the Gabriel electrode 1010c is a conductor disposed in an insulating material 1011. The insulating material 1011 holds the Gabriel electrode 1010c in place. The tip of the Gabriel electrode 1010c is positioned within the gap of the two electrodes such that it provides a shorter gap distance to one of the electrodes so that electrical breakdown will occur at a lower voltage than that if the Gabriel electrode were not present. The Gabriel electrode 1010c is connected through a series resistor (not shown, but typically on the order of a few mega ohms resistance). The function of the Gabriel electrode 1010c is to initiate an ionized column of gas at a more precise voltage level to start the formation of the arc in the gap. The resistor then limits the current through this electrode so that the arc current is carried through the conductors 1005a-b of the Jacob's ladder 1004. The Gabriel electrode 1010c thereby provides a smaller range of voltages over which the spark gap 1006 fires and the assembly 1000 enters its protection mode.

Figure 10C:
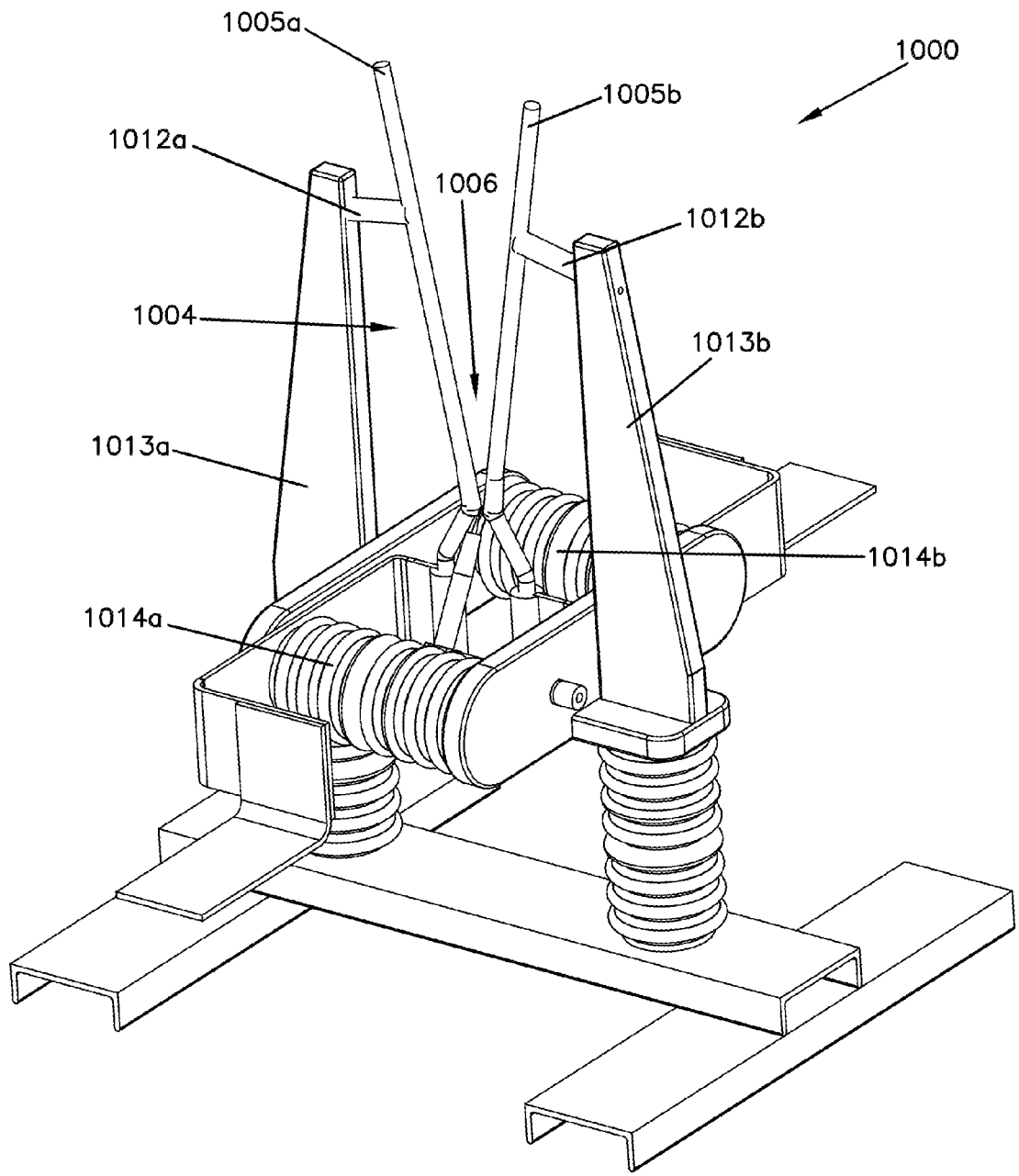
FIG. 10C is another perspective view of the overvoltage protection assembly of FIG. 10A.

FIG. 10C is another perspective view of the overvoltage protection assembly 1000. The standoffs 1012a-b are coupled to the support elements 1013a-b. Generally, the support elements 1013a-b are rigid and are formed from an insulating material, such as concrete. The standoffs 1012a-b and support elements 1013 are configured to secure the conductors 1005a-b. This helps stabilize the conductors 1005a-b against the forces generated when an arc current forms. Accordingly, use of such standoffs 1012a-b and support elements 1013 may be advantageous in circumstances where the current across the spark gap is great, for example up to 60,000 amps or more, which might otherwise cause substantial Lorentz forces and resulting damage to the assembly.

Additionally, in the embodiment shown, the spacing between the conductors 1005a-b is further secured by the insulators 1014a-b. The insulators 1014a-b are rigid and formed from an insulating material, such as concrete. The insulators 1014a-b are configured to secure the spacing between the conductors 1005a-b and, accordingly, the width of the spark gap 1006.

Figure 11B:
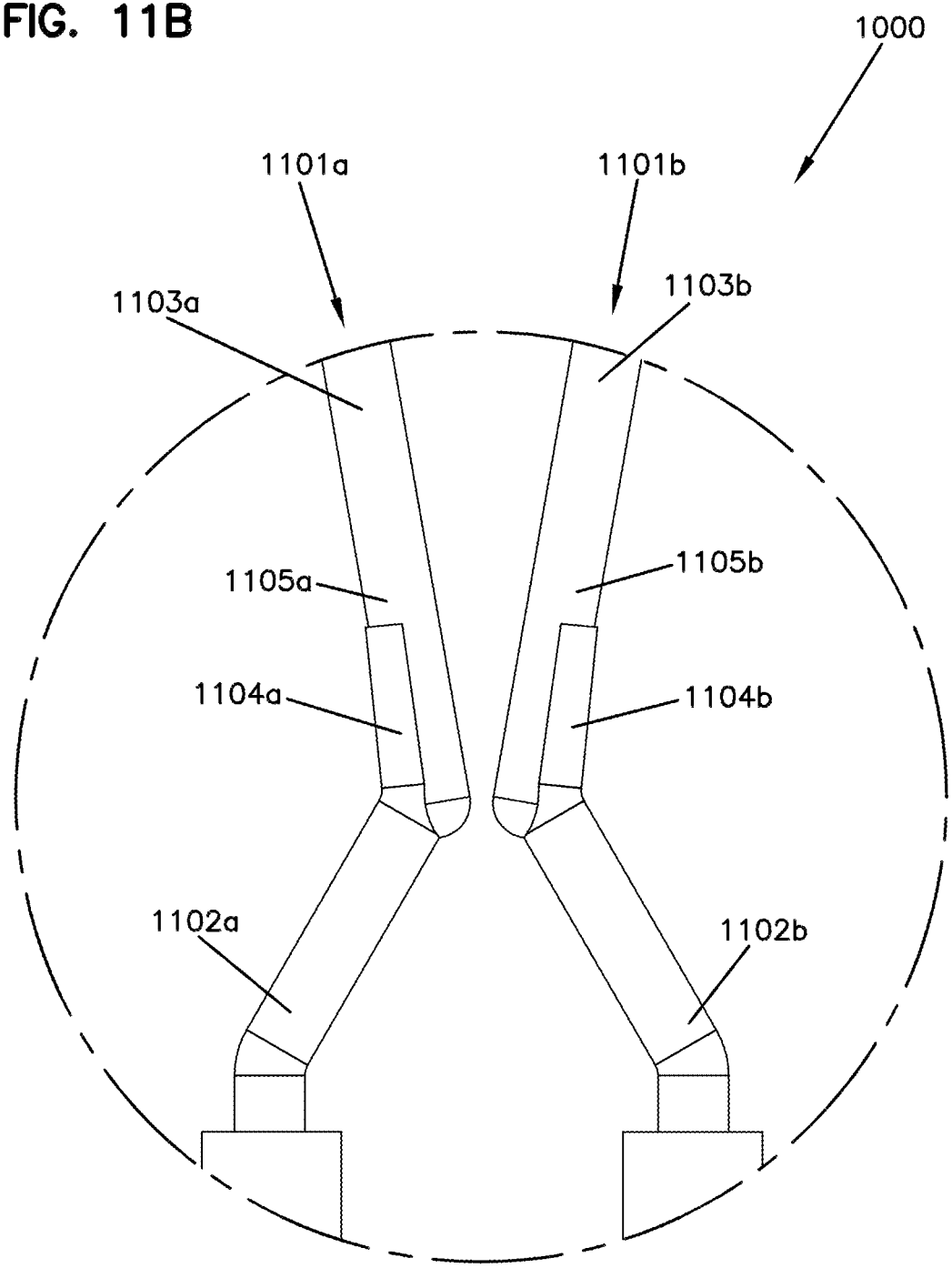
FIG. 11B is a close-up, perspective view of the embodiment of the electrodes of FIG. 11A.

Referring now to FIGS. 11A-B, conductors 1101a-b of a Jacob's ladder 1100 are shown, according to an example embodiment. The conductors 1101a-b have electrodes (shown in detail in FIG. 11B), and are configured to be used in the overvoltage protection systems described throughout this application. The conductors 1101a-b include lower portions 1102a-b and upper portions 1103a-b.

Generally, the materials selected for the conductors 1101a-b should have at least some of the following properties: high conductivity, stiffness, a high melting point to withstand the plasma energy that will be dissipated during arcing events, and the ability to be molded into the shape of a Jacob's ladder 1100. For example, some materials having these properties to varying degrees include tungsten, tungsten/copper alloy, niobium, and copper. Because the demands on the material used in the lower portions 1102a-b are different from the demands upon the material used to form the upper portions 1103a-b, a different material may be used to form the lower portions 1102a-b than is used to form the upper portions 1103a-b.

Generally, in the embodiment disclosed the lower portions 1102a-b are cylindrical, include an angled portion, and are configured to form a spark gap 1106 there between. In some embodiments, the diameter of the lower portions 1102a-b is ⅜ inch. Other embodiments are possible utilizing other cross-sectional shapes, or otherwise utilizing different diameters of electrodes. In some embodiments, the subtended angle of the conductors 1101a-b below the gap 1106 is larger than the subtended angle between the conductors 1101a-b above the gap 1106 so that the arc will move "up" the ladder. The subtended angle of the conductors above the gap 1106 should be sufficiently small to ensure that the arc does in fact move away from the connections at which equipment is protected. For example, a subtended angle between the conductors 1101a-b above the gap 1106 in the range of 50 to 80 degrees would be suitable for most high current arc applications. In some embodiments, the lower portions 1102a-b are formed from copper because it is amenable to forming the angled shape of the lower portion using forming die and pressing techniques. The methods of forming the shape of the lower portions 1102a-b using tungsten, tungsten/copper alloy, or niobium are more difficult.

Generally, the upper portions 1103a-b are cylindrical, straight, and configured to withstand the energy dissipated by an arcing event. In some embodiments, the diameter of the upper portions 1103a-b is ⅜ inch. Other embodiments are possible. In some embodiments the upper portions 1103a-b are formed from tungsten because tungsten has a high melting point. In other embodiments, the upper components are formed from tungsten/copper alloy or niobium. Tungsten, tungsten/copper alloy, and niobium have higher melting points and are stiffer than copper and thus allow the upper portions 1103a-b to withstand the energy dissipated by arcing events better than would many other conductive materials, such as copper.

In the embodiment shown, the lower portions 1102a-b are joined to the upper portions 1103a-b using a silver soldering process. The lower ends 1105a-b of the upper portions 1103a-b are machined to have a spherical surface. The upper ends of the lower portions 1102a-b are machined to accept the spherical surface of the lower end of the upper portions 1103a-b. In this manner, the conductors 1101a-b are formed using two different materials using common manufacturing techniques. In addition, conductors 1101a-b have a superior ability to withstand the energy dissipated by arcing events than if the conductors 1101a-b were formed from copper alone.

Figure 12:
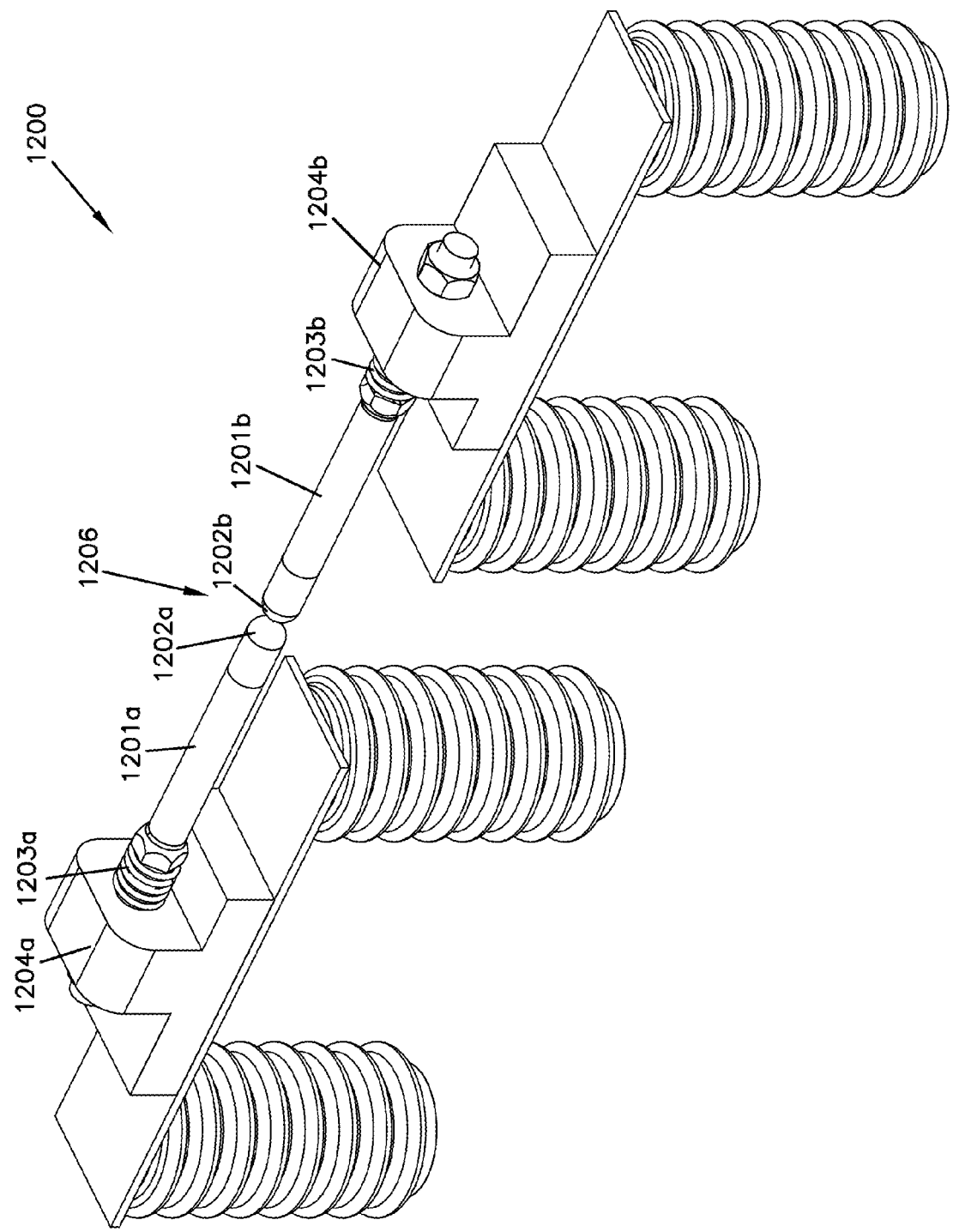
FIG. 12 is a perspective view of an overvoltage protection assembly according to another example embodiment.

FIG. 12 is a perspective view of an overvoltage protection assembly 1200 according to another example embodiment. The assembly 1200 includes conductors 1201a-b and a spark gap 1206.

Generally, the conductors 1201a-b are large-diameter, cylindrical rods with electrode ends 1202a-b having spherical surfaces. The diameter of the conductors 1201a-b is selected based on the expected arc current for a given application of the overvoltage protection assembly 1200.

The conductors 1201a-b are disposed horizontally such that the electrode ends 1202a-b are adjacent to one another. The electrode ends 1202a-b are separated by the spark gap 1206. In some embodiments, the conductors 1201a-b are formed from tungsten. In other embodiments, the conductors 1201a-b are formed from a different material with a high melting point, such as tungsten/copper alloy or niobium. In other embodiments, other materials may be used as well. Due to the spherical surfaces of electrode ends 1202a-b of the conductors 1201a-b, the arc will move around the spherical surfaces and will not ablate a single spot on the surface. Accordingly, in this embodiment the overvoltage protection assembly 1200 has a long life and may be reused for many ground fault events. In some embodiments, a Gabriel electrode is included in the spark gap 1206 to initiate the arc as has been described above.

In other embodiments, the conductors 1201a-b are not positioned horizontally but instead are positioned at an angle with respect to each other. In this manner, when the arc forms in the spark gap 1206, it will move upward on the spherical surfaces due to the Lorentz force as has been described above. This movement of the arc will allow for better dissipation of the arc energy and less ablation of the electrode material. In some embodiments, a Gabriel electrode is also included in the spark gap 1206 to initiate the arc at a given voltage as has been described above.

In some embodiments, springs 1203a-b are used in mounting the conductors 1201a-b to respective mounts 1204a-b. In such embodiments, the springs 1203a-b can compress and allow conductors 1201a-b to recoil away from one another. During normal operation, the two springs 1203a-b hold the conductors 1201a-b in normal positions, pointing at each other with an initial small gap there between. In cases where large electrical forces between the electrodes occur, a force between the electrodes will cause the electrodes to recoil, allowing for faster dissipation of the electrical effect, or arcing, between the electrodes. This will provide additional protection against damage to the electrodes in the event of arcing, since the arcing can be quickly dissipated.

Figure 13A:
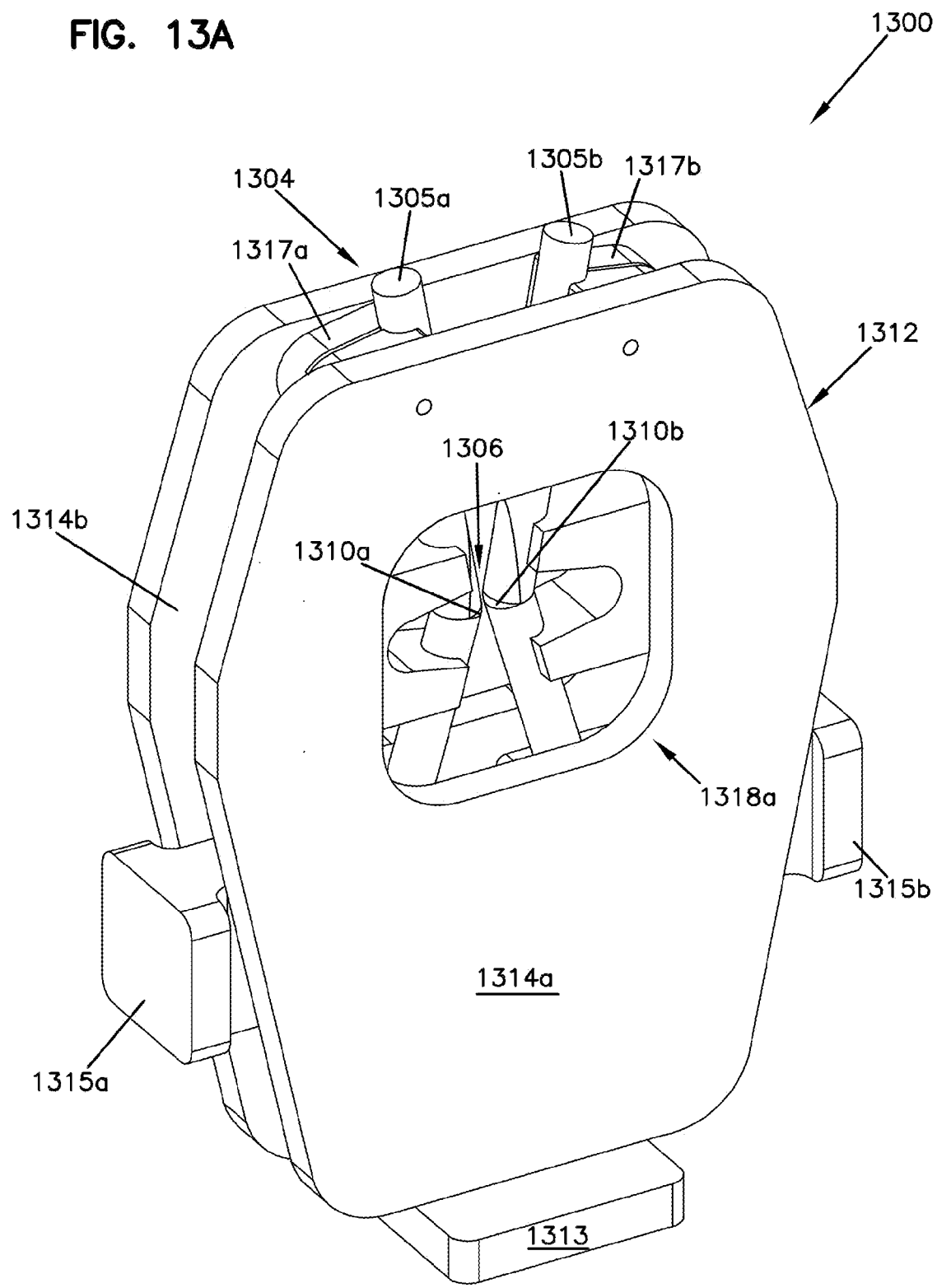
FIG. 13A is a perspective view of an overvoltage protection assembly according to another example embodiment.

FIG. 13A is a perspective view of an overvoltage protection assembly 1300 according to another example embodiment. The assembly 1300 includes a Jacob's ladder 1304, a spark gap 1306, and support structure 1312.

The Jacob's ladder 1304 includes conductors 1305a-b, which form electrodes 1310a-b. The Jacob's ladder 1304 is similar to the Jacob's ladder 1004 that is illustrated and described in greater detail with respect to FIGS. 10A-B. In some embodiments, the conductors 1305a-b have a diameter of 1-1.5 inches and a length of 10-18 inches. In some embodiments, the conductors 1305a-b are formed from a copper/tungsten alloy.

In the embodiment shown, the spark gap 1306 is similar to the spark gap 1006 that is illustrated and described in greater detail with respect to FIGS. 10A-B. In some embodiments of the assembly 1300, the width of the spark gap 1306 is 2-3 mm.

In example embodiments, the support structure 1312 is a physical structure formed from a rigid insulating material, such as ceramic or molded concrete, and is configured to support the conductors 1305a-b. During large ground fault currents, the conductors 1305a-b may carry extremely large currents (e.g., up to 60,000 amps or more), which may generate large Lorentz forces on the conductors 1305a-b. The support structure is configured to support and stabilize the conductors 1305a-b so that the conductors 1305a-b are less likely to be pushed apart or twisted by the Lorentz forces. Additionally, the support structure 1312 is configured to prevent or minimize the conductors 1305a-b from moving or warping. The support structure 1312 increases the mechanical stability of the Jacob's ladder 1304 and hence creates a more stable spark gap distance and a more consistent gap breakdown voltage.

The support structure 1312 includes base 1313, support walls 1314a-b, lower clamps 1315a-b, middle clamps 1316a-b, and upper clamps 1317a-b. Additionally, in some embodiments, the support walls 1314a-b include apertures 1318a-b. In some embodiments, the base 1313, the support walls 1314a-b and the lower clamps 1315a-b are formed from a rigid conducting material. The middle clamps 1316a-b are formed from an electrically insulating material. The upper clamps 1317a-b are formed integrally from a rigid conducting or insulating material. In other embodiments, the support structure 1312 is formed from multiple independent components that are coupled together with one or more fasteners, such as adhesives or screws.

In embodiments, the base 1313 is a rigid structure that provides strength to resist bending so that the conductors 1305a-b cannot be pushed apart by the Lorentz forces generated between conductors 1305a-b.

The support walls 1314a-b are formed from a rigid insulating material and are configured to support and secure the lower clamps 1315a-b, the middle clamps 1316a-b, and the upper clamps 1317a-b. Additionally, the support walls 1313a-b provide lateral support to prevent the conductors 1305a-b from twisting when subject to large Lorentz forces.

The apertures 1318a-b are openings in the support walls 1314a-b. The apertures 1318a-b are adjacent to the spark gap 1306 and are configured to allow the plasma blast that is created by the initial arc formed in the spark gap 1306 to escape. In this manner, the apertures 1318a-b allow the pressure created by the plasma blast to be released without damaging the support structure 1312.

Figure 13B:
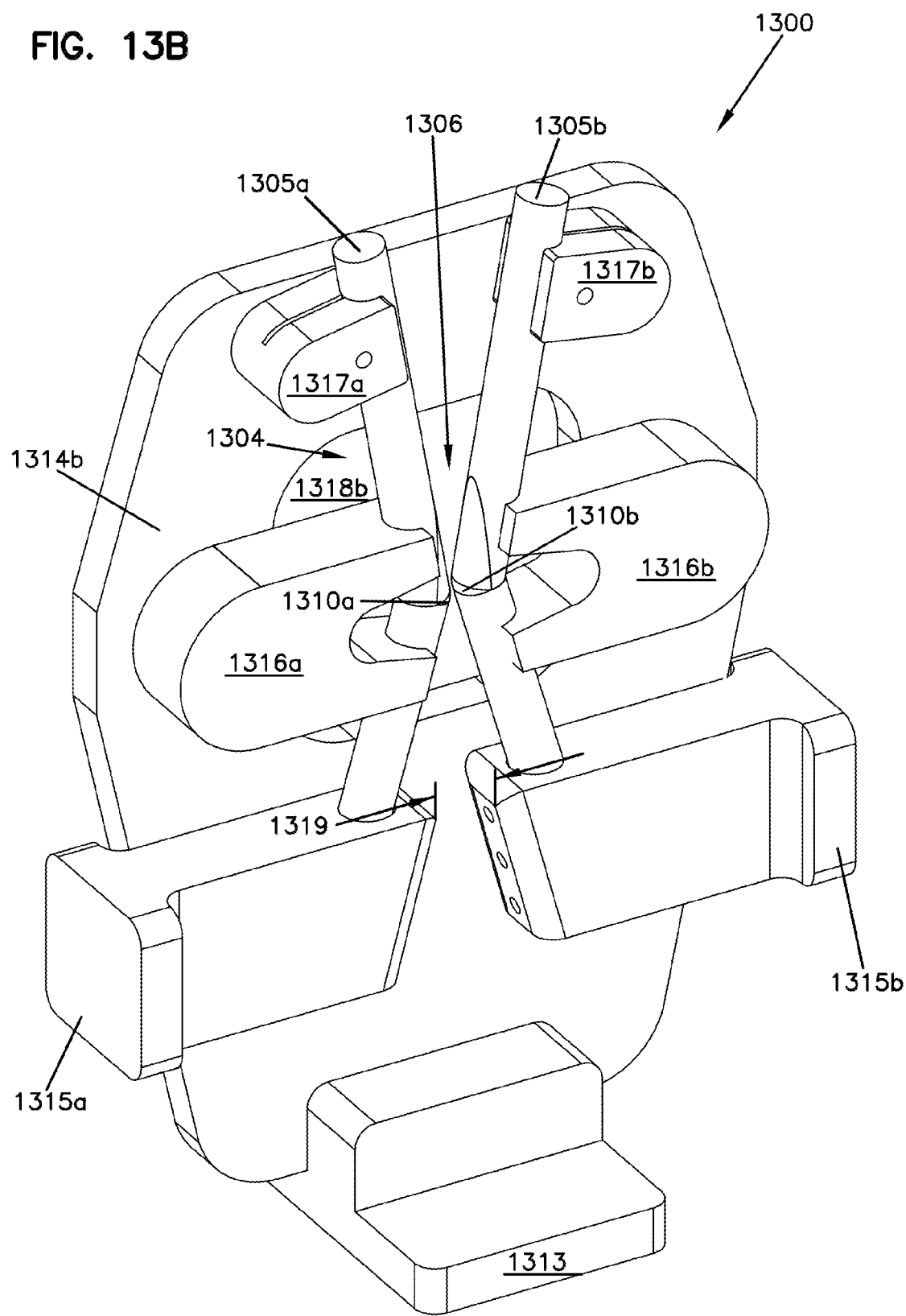
FIG. 13B is an perspective view of the of the inside of the overvoltage protection assembly of FIG. 13A.

FIG. 13B is an perspective view of the inside of the overvoltage protection assembly 1300. In this figure, the support wall 1314a is not shown so that the inside of the overvoltage protection assembly 1300 is visible.

The lower clamps 1315a-b are devices to secure the bottom of the conductors 1305a-b. In some embodiments, the lower clamps 1315a-b each includes a hole in which the bottom of its respective conductor 1305a or 1305b is disposed. In this manner, the lower clamps 1315a-b each fully surrounds its respective conductor 1305a or 1305b to provide increased stability and resistance to Lorentz forces.

In some embodiments, the lower clamps 1315a-b are separated by a gap 1319. The gap 1319 is sufficiently large enough to prevent the arcing across this gap between the lower clamps 1315a-b.

The middle clamps 1316a-b are devices to secure the middle of the conductors 1305a-b. In some embodiments, the middle clamps 1316a-b include one or more support surfaces configured to abut the surface of the conductors 1305a-b. In some embodiments, the support surfaces abut approximately half of the outer surface of the conductors 1305a-b. In this manner, the middle clamps 1316a-b support the conductors 1305a-b, but do not interfere with the formation of the arc in the spark gap 1306 or impede the arc from travelling up the conductors 1305a-b. Additionally, in some embodiments, the middle clamps 1316a-b do not abut the conductors 1305a-b at the spark gap 1306. In this manner, the middle clamps 1316a-b allow space for the plasma blast to escape from the spark gap 1306.

The upper claims 1317a-b are devices to secure the top or a region near the top of the conductors 1305a-b. In some embodiments, the upper clamps 1317a-b include one or more support surfaces configured to abut the surface of the conductors 1305a-b. In some embodiments, the support surfaces abut approximately half of the outer surface of the conductors 1305a-b. In this manner, the upper clamps 1317a-b support the conductors 1305a-b, but do not impede the arc from travelling up the conductors 1305a-b.

In some embodiments, multiple assemblies, such as assembly 1300, are disposed in a container and connected in parallel to the same conductor buses. During large ground fault currents, an arc current forms across the spark gap of one of the assemblies. The arc current forms in the assembly with the lowest breakdown voltage. The arc current may ablate a portion of the electrodes adjacent to the spark gap, causing the spark gap to widen and the breakdown voltage to increase. In some circumstances, the breakdown voltage increases beyond that of one of the other assemblies. During a second large ground fault current, an arc current then forms across the spark gap of one of the other assemblies. In this manner, overvoltage protection is provided over a longer lifetime than would be possible with a single assembly. An example embodiment that includes parallel spark gaps is illustrated and described in greater detail with respect to FIGS. 14A-D.

Further, in some embodiments of assembly 1300, the conductors 1305a-b are formed from multiple materials and are joined using silver soldering as is illustrated and described in greater detail with respect to FIGS. 11A-B.

Figure 14A:
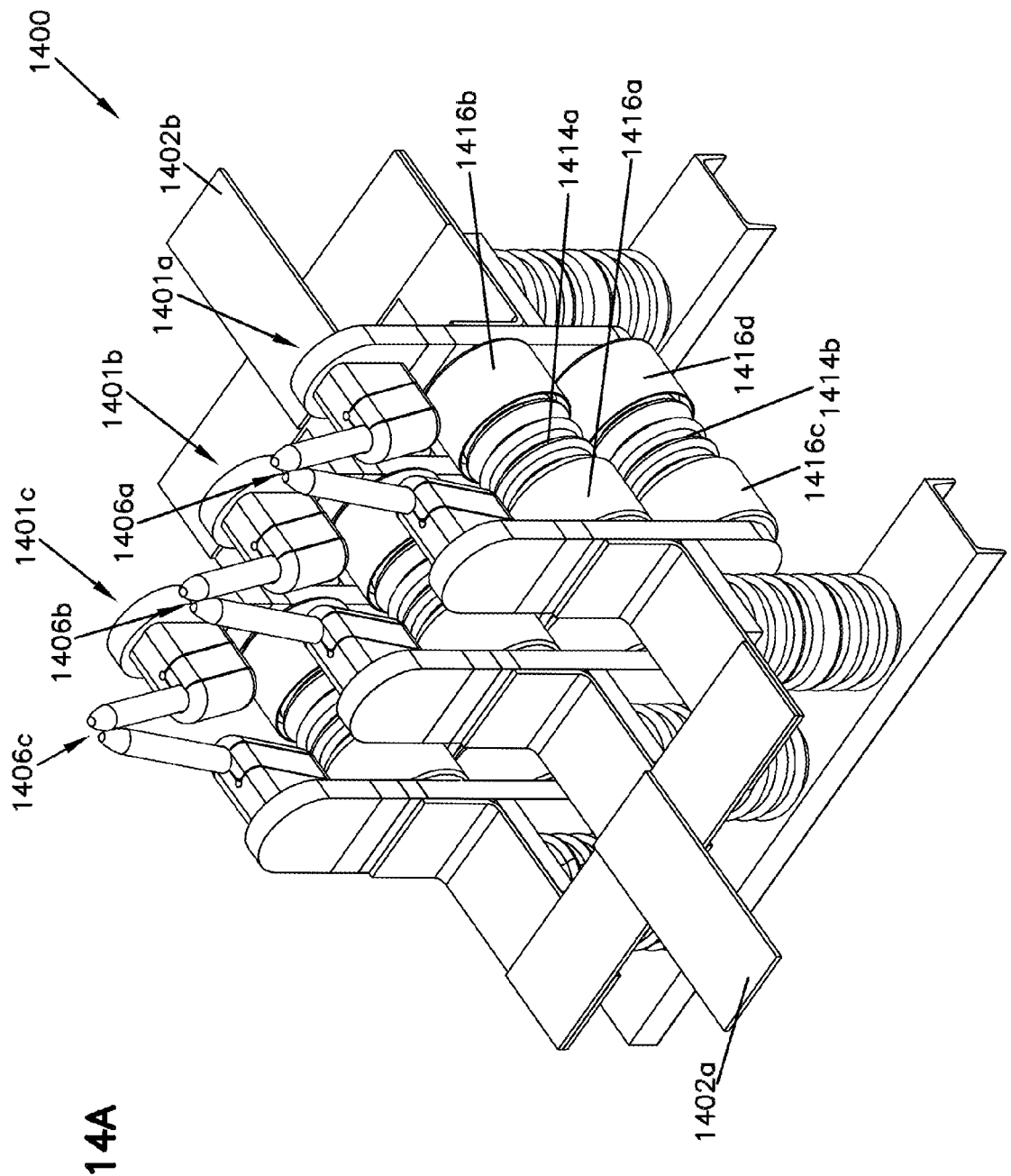
FIG. 14A is a perspective view of an overvoltage protection assembly according to another example embodiment.

FIG. 14A is a perspective view of an overvoltage protection assembly 1400 according to another example embodiment. The assembly 1400 includes a plurality of subassemblies 1401a-c and circuit leads 1402a-b. The subassemblies are connected in parallel to the circuit leads 1402a-b. Additionally, each of the subassemblies 1401a-c includes a spark gap 1406a-c. Although there are three subassemblies shown in this figure, other embodiments include more or fewer subassemblies.

In some embodiments, the widths of the spark gaps 1406a-c are substantially the same. When a large ground fault current triggers the breakdown voltage of one of the spark gaps 1406a-c, a portion of the corresponding electrodes surrounding the spark gap ablates and the width of the spark gap increases. This increase in spark gap width will cause a corresponding increase in breakdown voltage.

In some cases, the breakdown voltage of the spark gap after ablation caused by a large ground fault current will be greater than the breakdown voltage of one of the other spark gaps. Accordingly, during the next large ground fault current, the arc will initiate in a different spark gap. In this manner, the assembly 1400 will have an increased lifespan and will withstand a greater number of large ground fault currents.

Figure 14B:
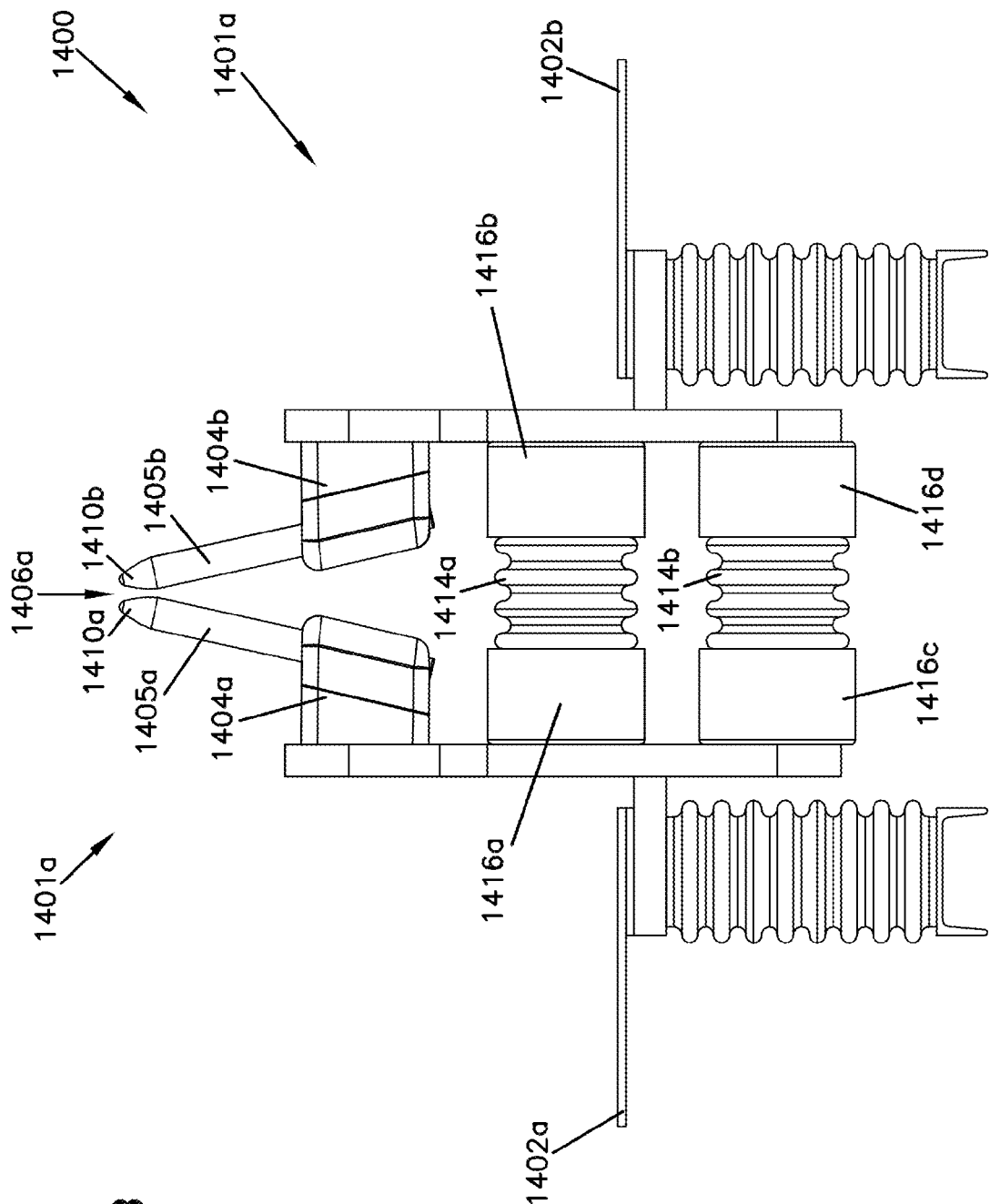
FIG. 14B is a side view of a subassembly of the overvoltage protection assembly of FIG. 14A.

FIG. 14B is a side view of the subassembly 1401a of assembly 1400. The subassembly 1401a includes mounts 1404a-b, conductors 1405a-b, electrodes 1410a-b, insulators 1414a-b, and cylindrical shields 1416a-d.

The mounts 1404a-b are rigid support structures that are configured to secure and support the conductors 1405a-b at a desired angle. In some embodiments, the mounts are configured to position the conductors 1405a-b at an angle of 2.5-20 degrees from vertical. The mounts 1404a-b are configured to withstand the Loretnz force generated between the conductors 1405a-b when an arc current is formed.

Generally, the conductors 1405a-b are large-diameter, cylindrical rods with tapered ends that form electrodes 1410a-b. The diameter of the conductors 1405a-b is selected based on the expected arc current for a given application of the overvoltage protection assembly 1400. The conductors 1405a-b are angled towards each other, such that the electrodes 1410a-b are adjacent to one another. In some embodiments, the subtended angle between the conductors 1405a-b is 5-40 degrees. The electrodes 1410a-b are separated by the spark gap 1406a.

In some embodiments, the conductors 1405a-b and the electrodes 1410a-b are formed integrally from a rigid, conducting material with a high melting point. For example, in some embodiments, the conductors 1405a-b and the electrodes 1410a-b are formed from a copper/tungsten alloy. In other embodiments, the conductors 1405a-b and the electrodes 1410a-b are formed from different materials such as tungsten, copper, and niobium. In some embodiments, a Gabriel electrode is included in the spark gap 1406 to initiate the arc as has been described above.

Additionally, the spacing between the electrodes 1410a-b is further secured by the insulators 1414a-b. The insulators 1414a-b are rigid and formed from an insulating material, such as concrete. In some embodiments, the insulators 1414a-b have a cylindrical shape. The insulators 1414a-b are configured to secure the spacing between the mounts 1404a-b, the conductors 1405a-b, and the electrodes 1410a-b, and accordingly, the width of the spark gap 1406 as well.

In some embodiments, cylindrical shields 1416a-d are included. The cylindrical shields are hollow cylinders that are disposed around the insulators 1414a-b and are configured to interfere with the formation of a conductive path (from deposited carbon or materials expelled during an arc) along the surface of the insulators 1414a-b. In some embodiments, the radius of each of the cylindrical shields 1416a-d is 0.5-1 inches greater than the radius of the insulators 1414a-b.

Figure 14C:
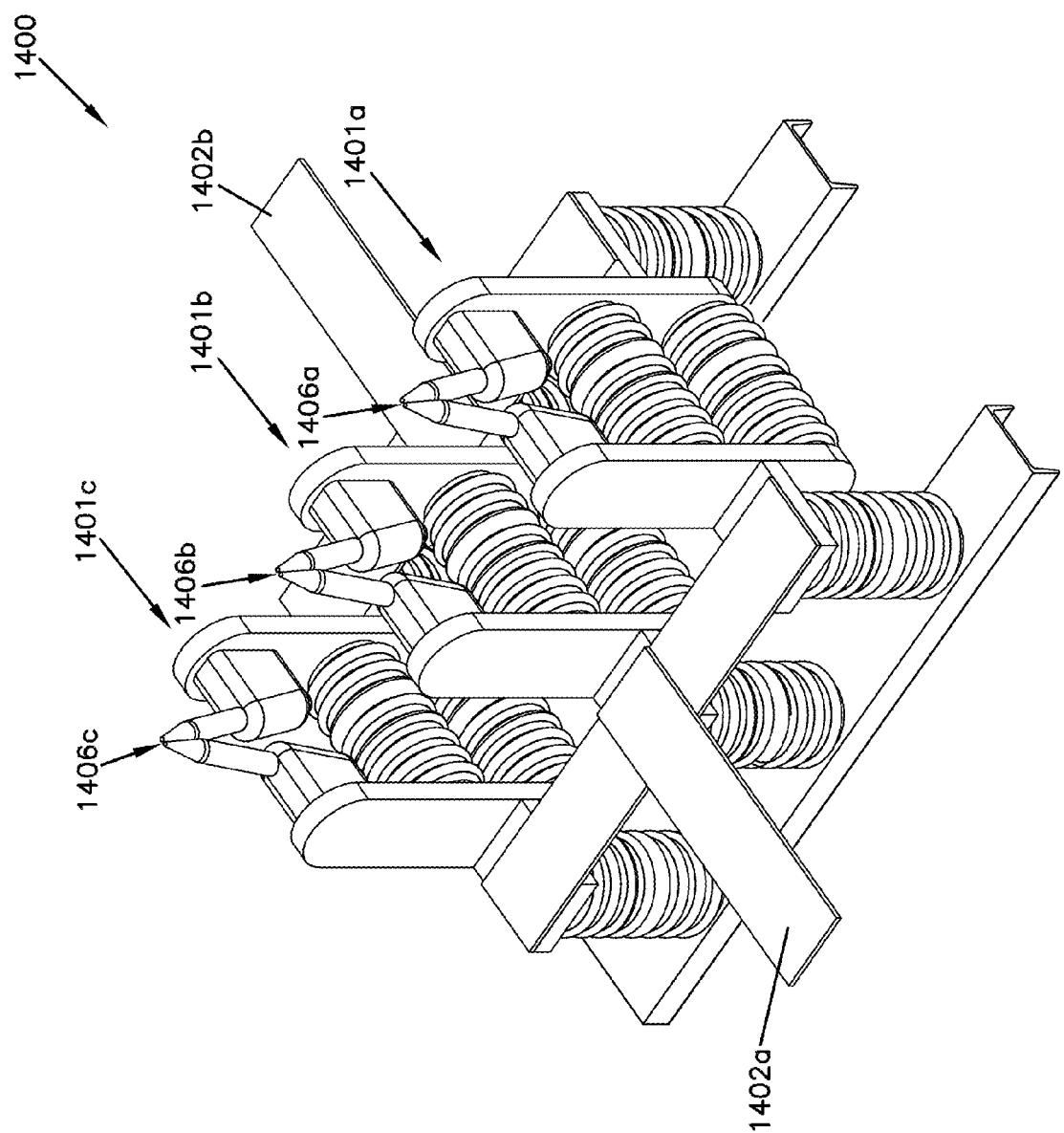
FIG. 14C is a perspective view of an alternate embodiment of the overvoltage protection assembly of FIG. 14A.

FIG. 14C is a perspective view of an overvoltage protection assembly 1400 according to another example embodiment. The assembly 1400 shown in FIG. 14C is similar to the assembly 1400 shown in FIGS. 14A-B except that it does not include the cylindrical shields 1416a-d.

Figure 14D:
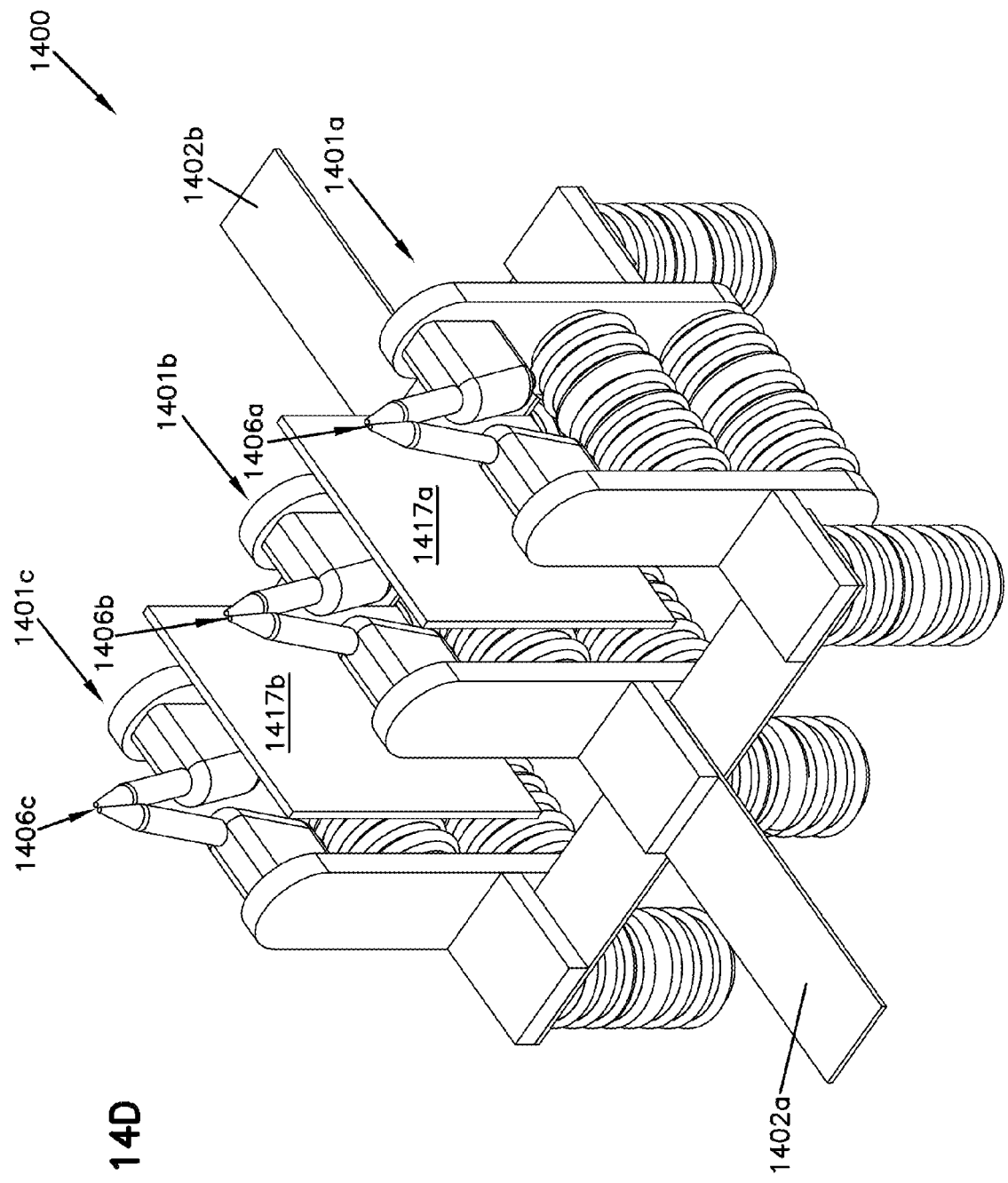
FIG. 14D is a perspective view of an alternate embodiment of the overvoltage protection assembly of FIG. 14A.

FIG. 14D is a perspective view of an overvoltage protection assembly 1400 according to another example embodiment. The assembly 1400 shown in FIG. 14C is similar to the assembly 1400 shown in FIGS. 14A-B except that it additionally includes barriers 1417a-b.

The barriers 1417a-b are physical structures formed from an insulating material and are configured to separate the subassemblies 1401a-c from each other. In some embodiments, the barriers 1417a-b are configured to prevent an arc current from forming between subassemblies 1401a-c. Additionally, in some embodiments, the barriers 1417a-b are configured to prevent plasma and other material expelled from one of the subassemblies 1401a-c during an arc current from reaching the others of the subassemblies 1401a-c.

Figure 14E:
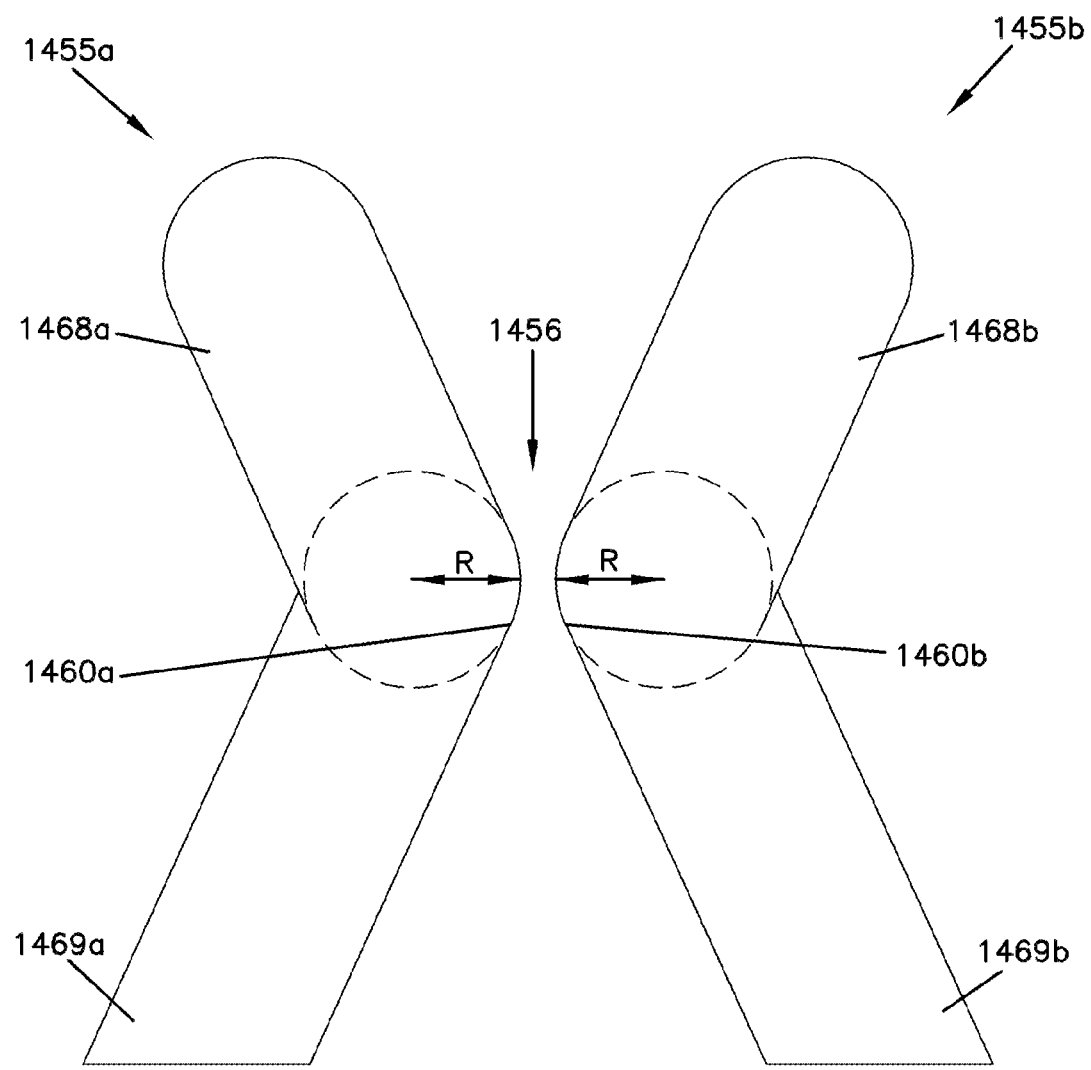
FIG. 14E is a side view of an alternate embodiment of the conductors of the overvoltage protection assembly of FIG. 14A.

FIG. 14E is a side view of conductors 1455a-b, electrodes 1460a-b, and spark gap 1456 according to another example embodiment. The conductors 1455a-b are an alternate embodiment of the conductors 1405a-b, the electrodes 1460a-b are an alternate embodiment of the electrodes 1410a-b, and the spark gap 1456 is alternate embodiment of the spark gap 1406a. In some embodiments of assembly 1400, some or all of assembly 1401a-c include the conductors 1455a-b, the electrodes 1460a-b, and the spark gap 1456 instead of the conductors 1405a-b, the electrodes 1410a-b, and one of the spark gaps 1406a-c.

The conductors 1455a-b include upper portions 1468a-b and lower portions 1469a-b. Additionally, the conductors 1455a-b form electrodes 1460a-b, which define the spark gap 1456a. The upper portions 1468a-b are angled away from each other such that after an arc forms in the spark gap 1456a, it will climb the upper portions 1468a-b and dissipate greater amounts of energy as it does so. In some embodiments, the upper portions 1468a-b have a length of 2.5 inches. In other embodiments, the upper portions 1468a-b are shorter or longer. In some embodiments, the upper portions 1468a-b are formed from a different material than the lower portions 1469a-b. In these embodiments, the upper portions 1468a-b are joined to the lower portions 1469a-b using a silver soldering process, as has been illustrated and described with respect to FIGS. 11A-B.

In FIG. 14E, the electrodes 1460a-b have a curved surface with a radius R. In some embodiments, the radius R is 2 inches. In other embodiments, the radius R is 1-3 inches. In other embodiments of the electrodes 1460a-b, the radius R is smaller or larger.

The electrodes 1460a-b are configured to initiate an arc current across the spark gap 1456a when the breakdown voltage of the spark gap 1456a is exceeded. As has been described previously, the breakdown voltage of the spark gap 1456a is based on its width. Often, material from the electrodes 1460a-b is ablated by the heat and plasma generated by the arc current. This causes the spark gap 1456a to widen and consequently the break down voltage to increase. Due to the curved surfaces of electrodes 1460a-b, the arc will move around the curved surfaces and will only minimally ablate a single spot on the surface. Accordingly, in this embodiment the electrodes 1460a-b may have a long life and may be reused for many ground fault events.

Figure 14F:
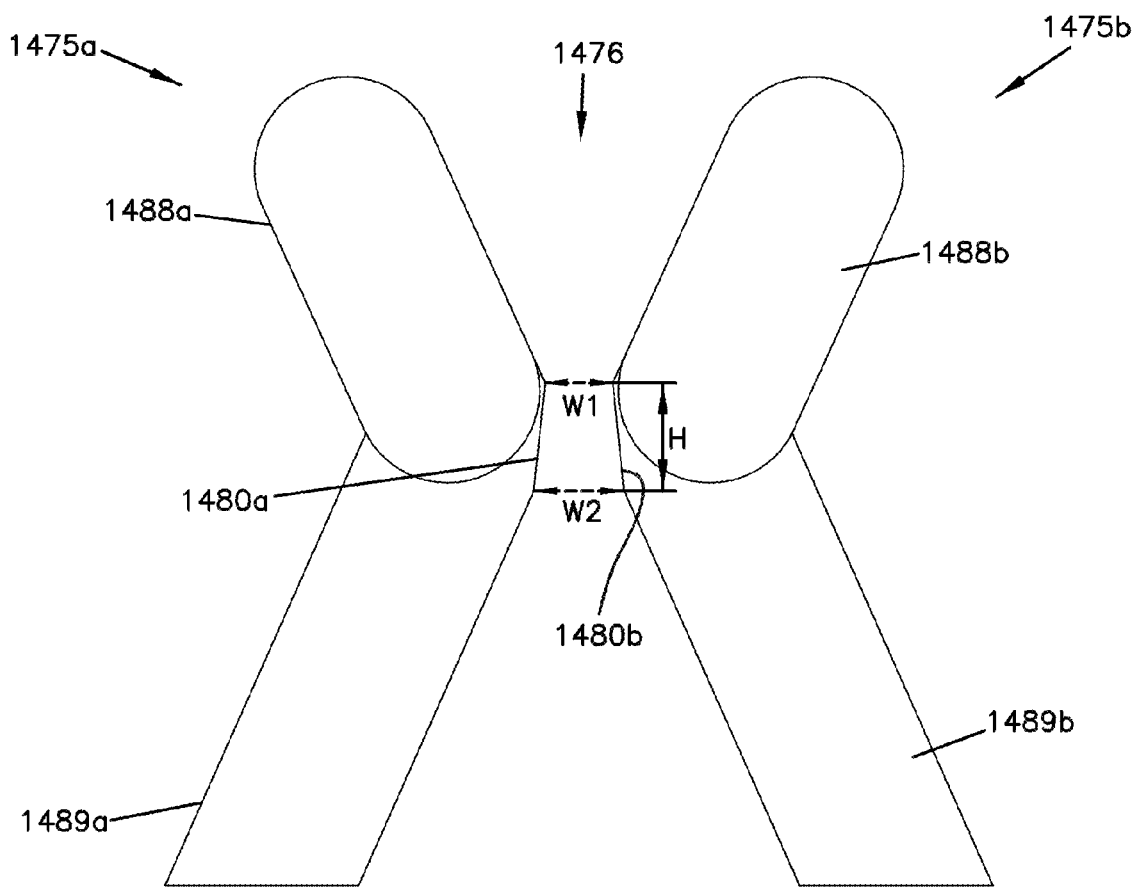
FIG. 14F is a side view of another alternate embodiment of the conductors of the overvoltage protection assembly of FIG. 14A.

FIG. 14F is a side view of conductors 1475a-b, electrodes 1480a-b, and spark gap 1476 according to another example embodiment. The conductors 1475a-b are an alternate embodiment of the conductors 1405a-b, the electrodes 1480a-b are an alternate embodiment of the electrodes 1410a-b, and the spark gap 1476 is alternate embodiment of the spark gap 1406a. In some embodiments of assembly 1400, some or all of assembly 1401a-c include the conductors 1475a-b, the electrodes 1480a-b, and the spark gap 1476 instead of the conductors 1405a-b, the electrodes 1480a-b, and one of the spark gaps 1406a-c.

The conductors 1475a-b include upper portions 1488a-b and lower portions 1489a-b. The embodiment shown in FIG. 14F is similar to the embodiment shown in FIG. 14E, except that the surface of the electrodes 1480a-b are flat rather than curved. In some embodiments, the tops of the electrodes 1480a-b are separated by a smaller distance than the bottoms of the electrodes 1410a-b. For example, in some embodiments the tops of the electrodes 1480a-b are separated by a first width W1 and the bottoms of the electrodes 1480a-b are separated by a slightly larger second width W2. In some embodiments, the width W1 is 3.9 millimeters and the width W2 is 4.3 millimeters. In some embodiments, the flat surfaces of the electrodes 1480a-b have a height H. In some embodiments, the height H is 1 inch. However, other embodiments with other heights and other first and second widths are possible as well. During an initial high ground fault voltage, the arc current will form at the top of the electrodes 1480a-b. As material is ablated during high ground fault current events, the arc will start at lower positions in the spark gap 1476.

Figure 15A:
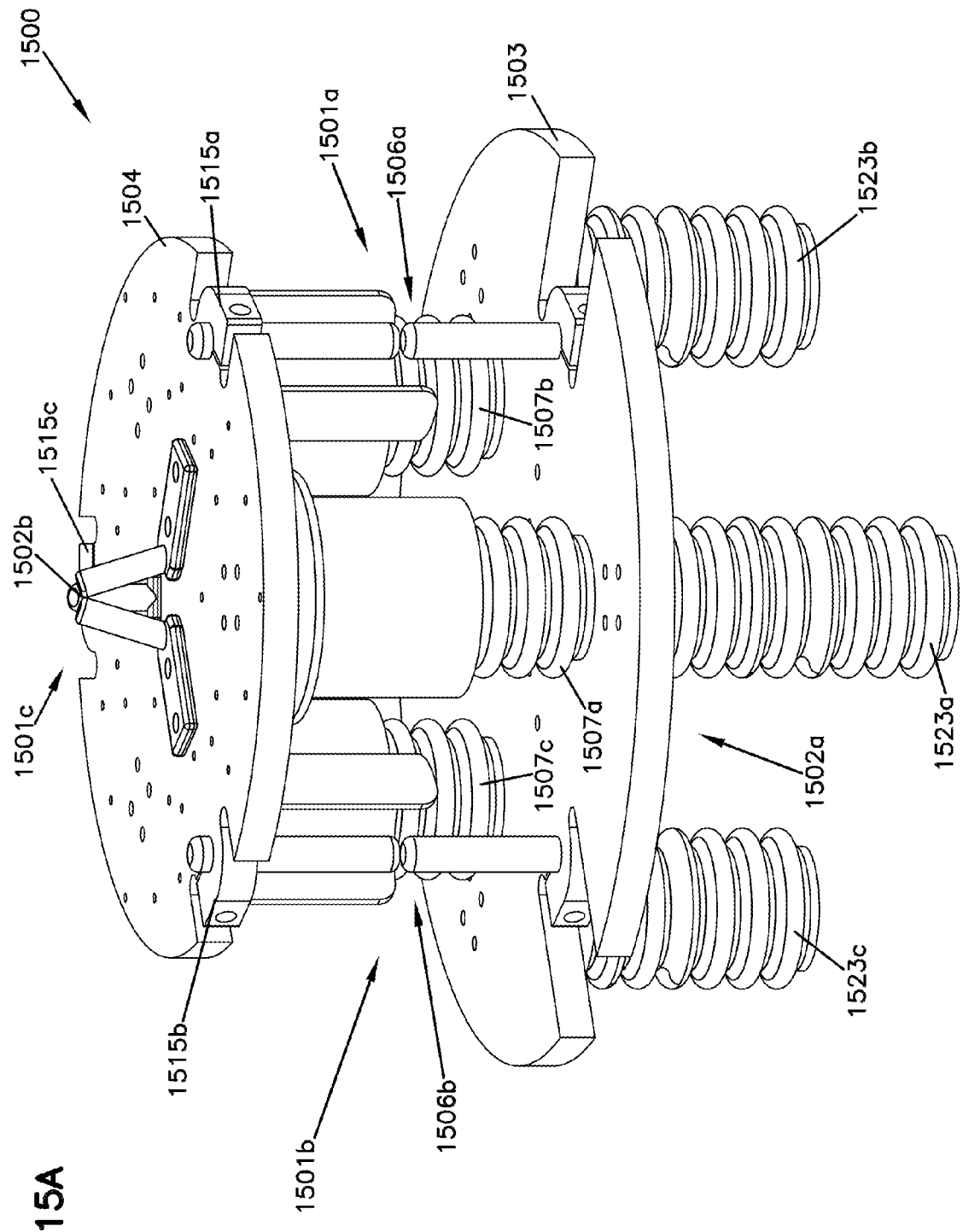
FIG. 15A is a perspective view of an overvoltage protection assembly according to another example embodiment.
Figure 15B:
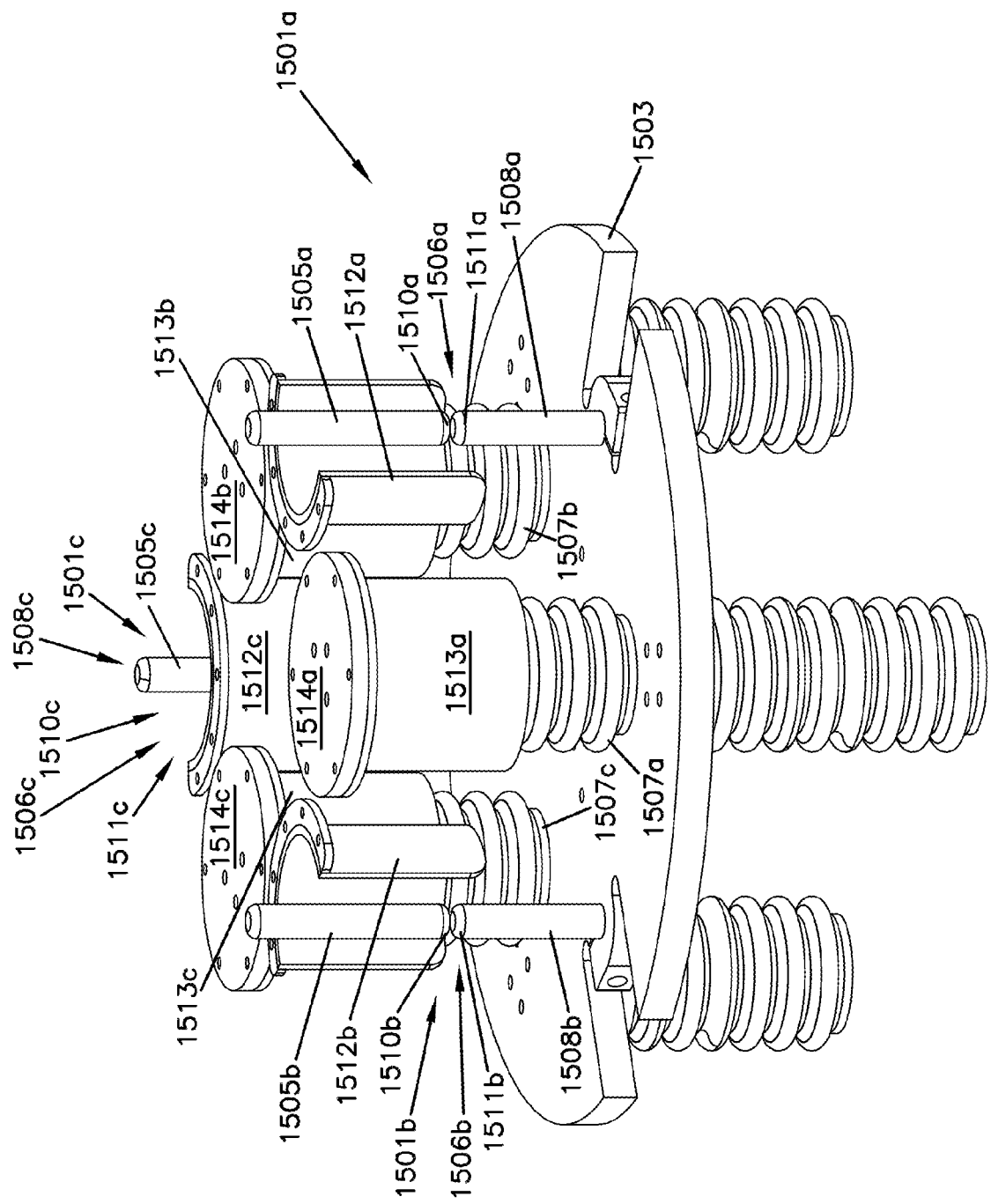
FIG. 15B is another perspective view of the overvoltage protection assembly of FIG. 15A.

FIG. 15A is a perspective view of an overvoltage protection assembly 1500 according to another example embodiment. The assembly 1500 is circular and includes a plurality of subassemblies 1501a-c, circuit leads 1502a-b, lower plate 1503, upper plate 1504, stand-off insulators 1507a-c, and lower insulators 1523a-c. The subassemblies 1501a-c are equally spaced around the assembly 1500, being separated from each other by a 120 degree angle, and are connected in parallel to the circuit leads 1502a-b. Additionally, each of the subassemblies 1501a-c includes a pair of conductors that form a pair of electrodes and a spark gap 1506a-c (these elements are best seen in FIG. 15B). Although there are three subassemblies shown in this figure, other embodiments include more or fewer subassemblies.

The lower plate 1503 is a round disc-like structure formed from a rigid conductive material. Similarly, the upper plate 1504 is also a round disc-like structure formed from a rigid conductive material. In some embodiments, one or both of the lower plate 1503 and the upper plate 1504 are not round but instead have a different shape, such as a rectangle. The subassemblies 1501a-c are disposed and secured between the lower plate 1503 and the upper plate 1504.

The stand-off insulators 1507a-c are rigid structures formed from a rigid insulating material and are configured to secure the upper plate 1504 to the lower plate 1503. The upper plate 1504 is separated from the lower plate 1503 by the height of the stand-off insulators 1507a-c. In some embodiments, the stand-off insulators 1507a-c are 8 inches high and 4 inches in diameter. In other embodiments, the stand-off insulators 1507a-c are taller or shorter or have a different diameter.

The lower insulators 1523a-c are rigid structures formed from a rigid insulating material and are configured to support the assembly 1500. The lower insulators 1523a-c are secured to the lower plate 1503.

FIG. 15B is another perspective view of the overvoltage protection assembly 1500. In FIG. 15B, the upper plate 1504 is not shown to provide a clearer view of the subassemblies 1501a-c and the stand-off insulators 1507a-c. Also shown are cylindrical shields 1513a-c and insulating discs 1514a-c.

The subassemblies 1501a-c include upper conductors 1505a-c, lower conductors 1508a-c, and half-cylinder shields 1512a-c. In some embodiments, the upper conductors 1505a-c and the lower conductors 1508a-c have a diameter of 1-1.5 inches. The upper conductors 1505a-c and the lower conductors 1508a-c are oriented vertically. The bottom of the upper conductors 1505a-c form upper electrodes 1510a-c. Similarly, the top of the lower conductors 1508a-c form lower electrodes 1511a-c. The spark gaps 1506a-c are vertical gaps formed between the upper electrodes 1510a-c and the lower electrodes 1511a-c in each of the subassemblies 1501a-c. The lower conductors 1508a-c are secured to the lower plate with lower clamps 1517a-c (best seen in FIGS. 15C-D). The lower clamps 1517a-c can be used to individually adjust the height of the lower conductors 1508a-c and consequently the size of the spark gaps 1506a-c. In some embodiments, the assembly 1500 is configured so that each of the spark gaps 1506a-c has a different size and consequently a different breakdown voltage. Additionally, in some embodiments, the upper conductors 1505a-c are raised or lowered using upper clamps 1515a-c instead of or in addition to raising or lowering the lower conductors 1508a-c.

The half-cylinder shields 1512a-c are physical structures with the shape of a hollow half-cylinder and are formed from either a conducting an insulating material. The half-cylinder shields 1512a-c are disposed around the inner side of the upper conductors 1505a-c. The half-cylinder shields 1512a-c are configured to prevent the arc from one subassembly from initiating an arc in another subassembly. The half-cylinder shields 1512a-c are also configured to prevent plasma and materials that are expelled when an arc is formed from reaching the stand-off insulators 1507a-c. Additionally, the half-cylinder shields 1512a-c direct the blast created when an arc current forms towards the outside of the assembly 1500. The half-cylinder shields 1512*a-c* are oriented vertically and are secured to and hang down from the upper plate 1504. The half-cylinder shields 1512*a-c* do not extend to the lower plate 1503 and thus do not provide a surface upon which a conductive path (i.e., short circuit) could form from materials deposited during arc events.

The cylindrical shields 1513*a-c* are physical structures with the shape of a hollow cylinder and are formed from either a conducting or an insulating material. The cylindrical shields 1513*a-c* are disposed around the stand-off insulators 1507*a-c*. The cylindrical shields 1513*a-c* are configured to prevent plasma and materials that are expelled when an arc is formed in the subassemblies 1501*a-c* from depositing on the stand-off insulators 1507*a-c*. The cylindrical shields 1513*a-c* are oriented vertically and are secured to and hang down from the upper plate 1504. The cylindrical shields 1513*a-c* do not extend to the lower plate 1503 and thus do not provide a surface upon which a conductive path (i.e., short circuit) could form from materials deposited during arc events.

The insulating discs 1514*a-c* are disc-shaped physical structures that are disposed between the cylindrical shields 1513*a-c* and the upper plate 1504 and are formed from an insulating material. In some alternative embodiments, other types of discs could be used, such as conductive discs. In some embodiments, the insulating discs 1514*a-c* are 0.5-1 inches thick. The insulating discs 1514*a-c* are configured to further minimize or eliminate the possibility that a conduction path will form between the upper plate 1504 and the lower plate 1503 due to the materials emitted during arc events.

Figure 15D:
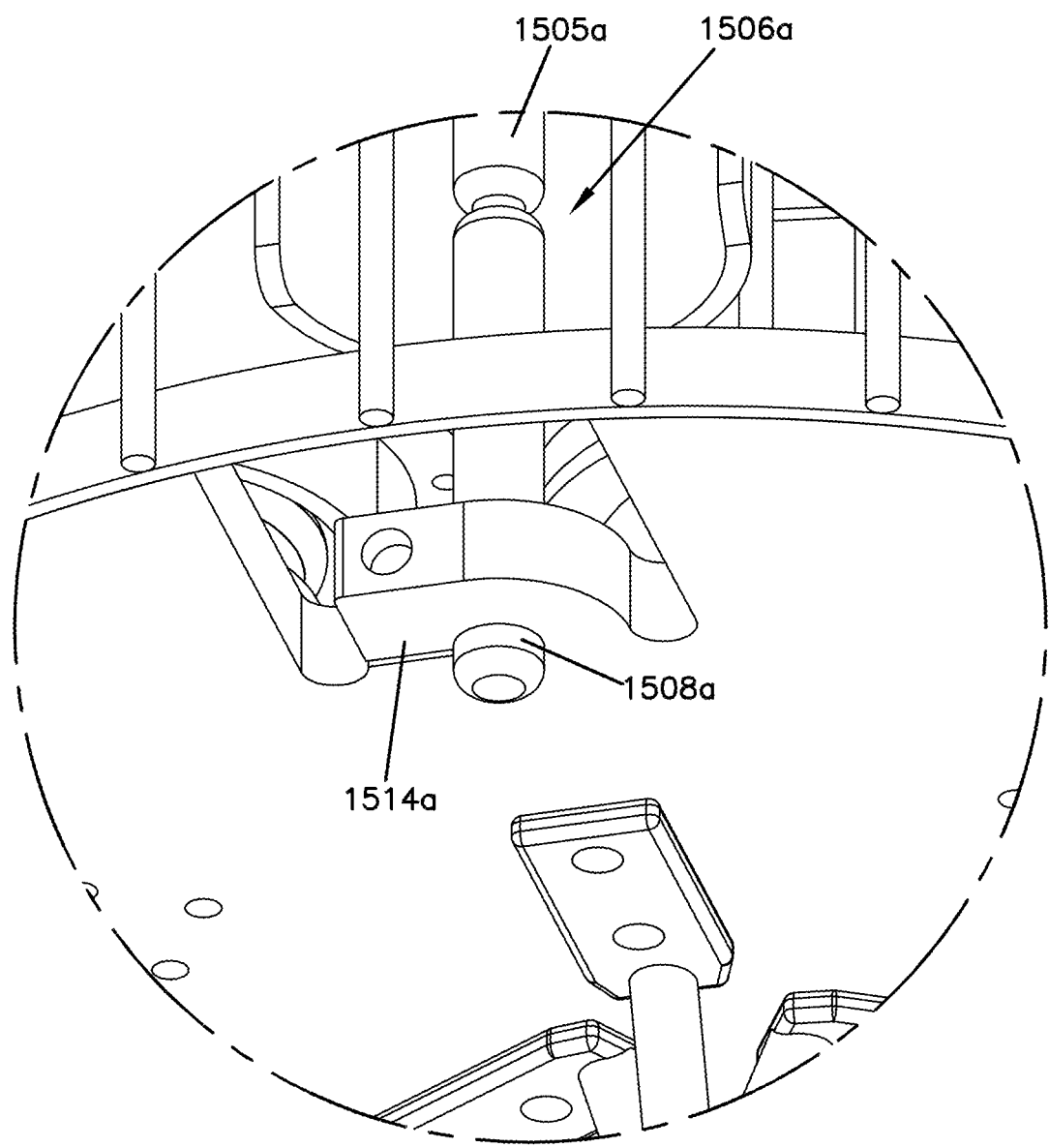
FIG. 15D is a close-up, perspective view from below of the overvoltage protection assembly of FIG. 15A.

FIGS. 15C-D are perspective views from below of the assembly 1500. The upper plate 1504 is not shown in these figures. The roof 1519 and the adjustment mechanism 1518*a* of the lower clamp 1517*a* are shown in this figure.

The roof 1519 is a cone-shape physical structure and is configured to prevent rain and snow from entering the assembly 1500.

The adjustment mechanism 1518*a* is a component of the lower clamp 1517*a* and is configured to adjustably control the tightness of the lower clamp 1517*a*. When the lower clamp 1517*a* is loosened using the adjustment mechanism 1518*a*, the position of the lower conductor 1508*a* may be adjusted. When the lower clamp 1517*a* is tightened using the adjustment mechanism 1518*a*, the lower conductor 1508*a* is held securely in place and cannot be moved or adjusted. In some embodiments, the adjustment mechanism 1518*a* includes thumb screws. Other embodiments of adjustment mechanism 1518*a* are possible as well. The lower clamps 1517*b-c* include adjustment mechanisms as well.

Figure 15E:
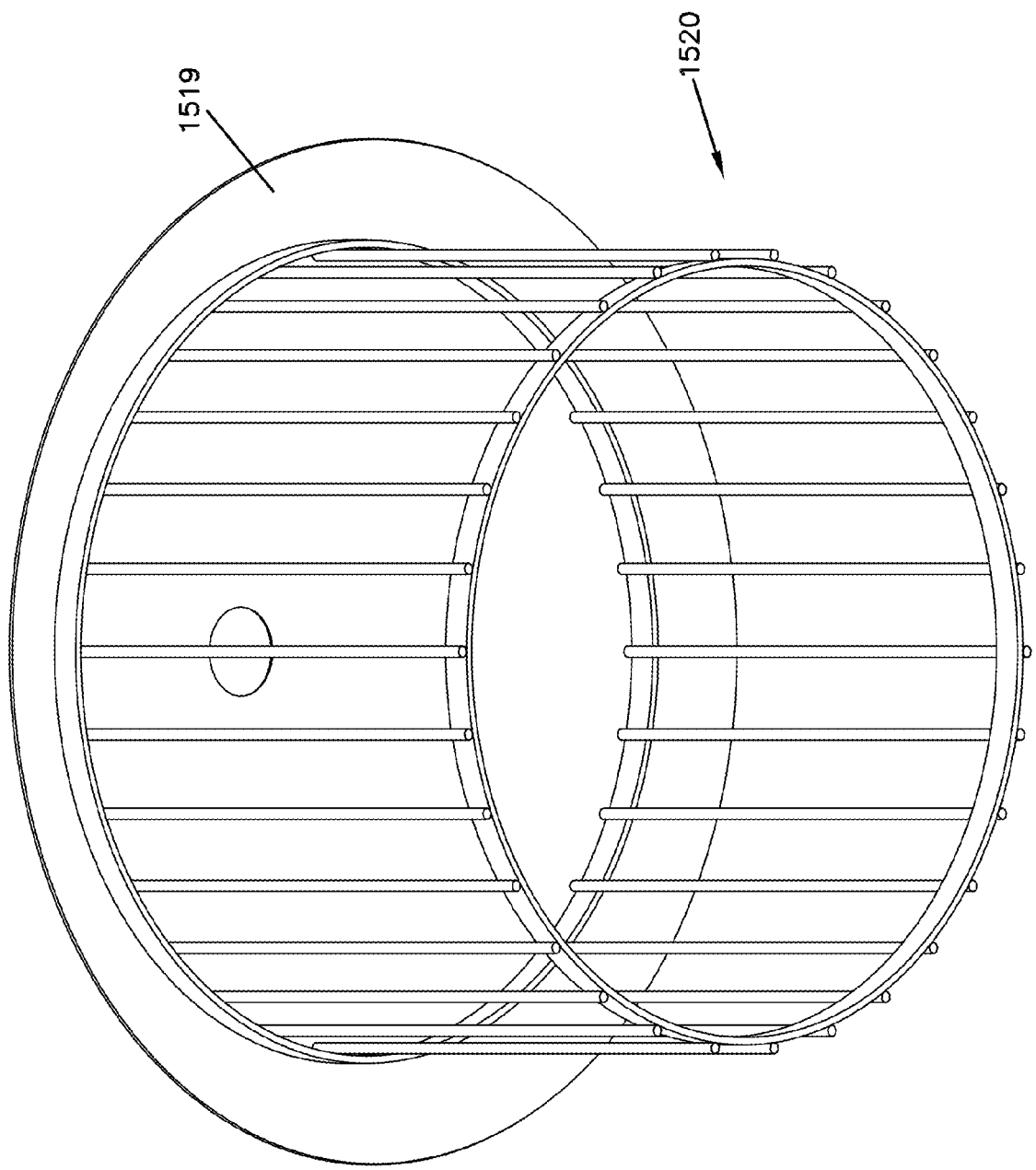
FIG. 15E is a perspective view from below of the roof and the cage of the overvoltage protection assembly of FIG. 15A.

FIG. 15E is a perspective view from below of the roof 1519 and the cage 1520 of the assembly 1500. The cage 1520 is a physical structure that surrounds the subassemblies 1501*a-c* and is configured to prevent people and objects from touching the subassemblies 1501*a-c*. In some embodiments, the cage 1520 is not solid, but has openings to permit pressure, material, and gasses that are released during an arc event to escape.

Figure 15F:
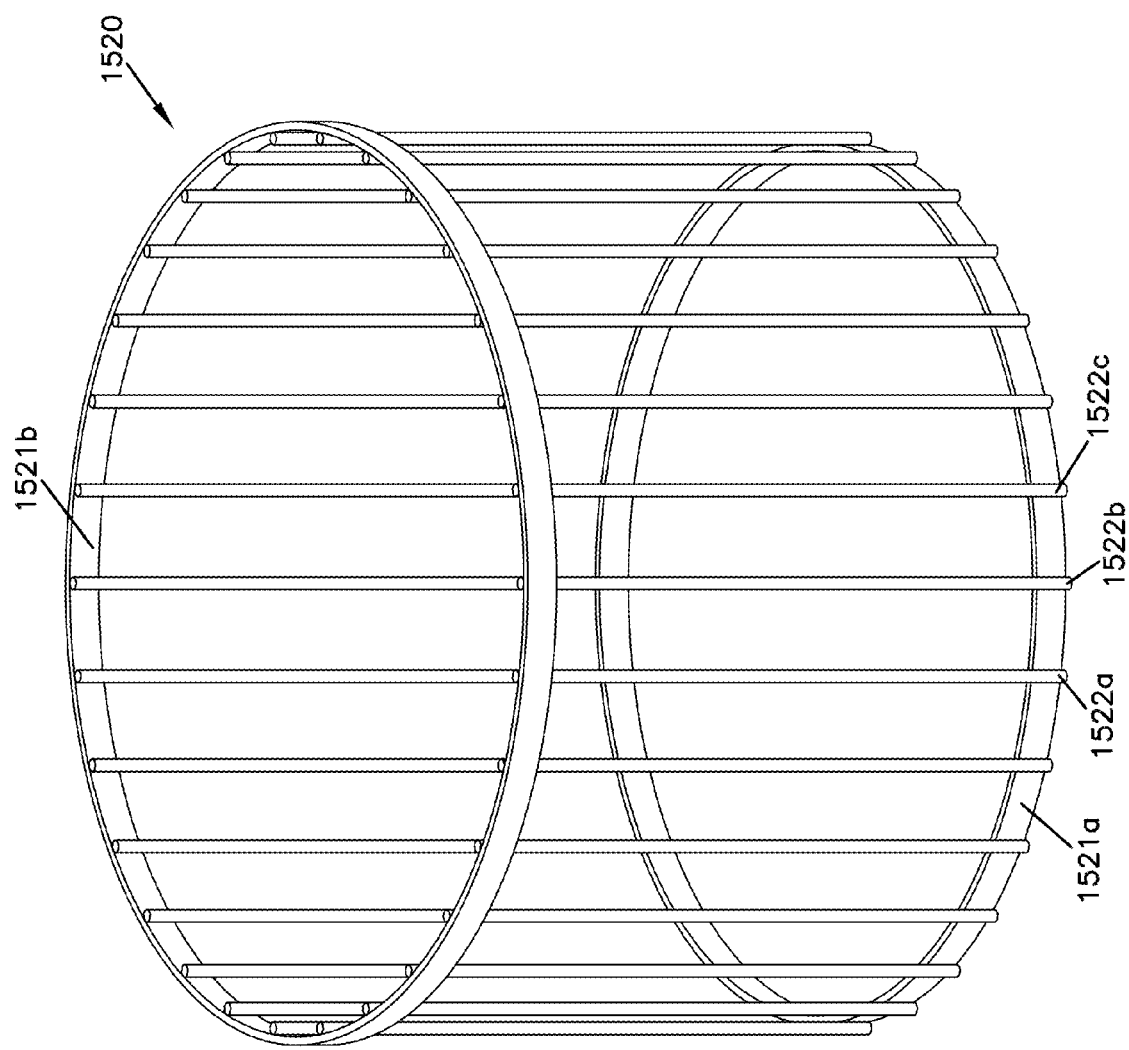
FIG. 15F is a perspective view of the cage of the overvoltage protection assembly of FIG. 15A.

FIG. 15F is a perspective view of the cage 1520 of the assembly 1500. The cage is formed from rings 1521*a-b*, which are joined by a plurality of columns, including columns 1522*a-c*. Other embodiments of cage 1520 are possible as well.

Figure 16:
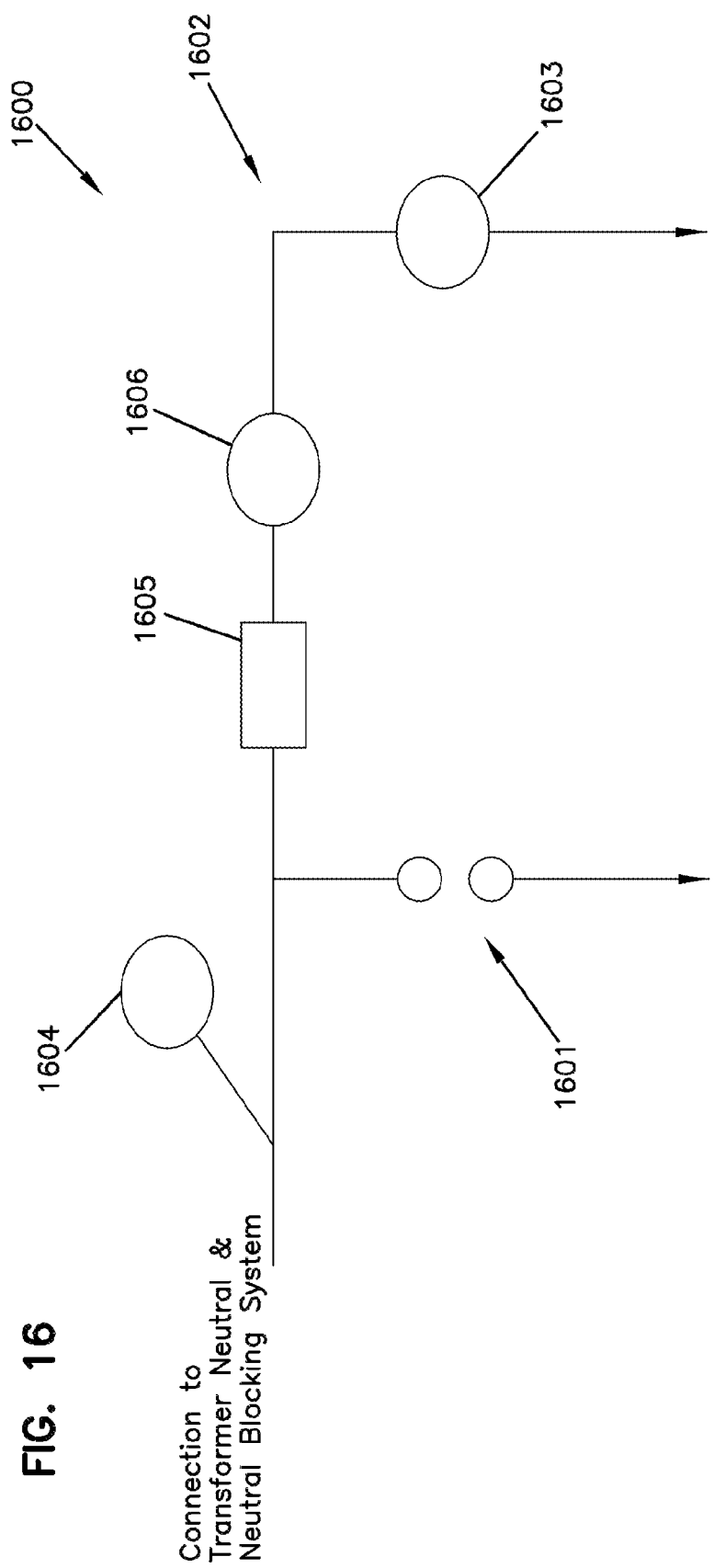
FIG. 16 is a circuit diagram of an overvoltage protection system according to another example embodiment.

FIG. 16 is a circuit diagram of an overvoltage protection system 1600 according to another example embodiment. The system 1600 includes overvoltage protection assembly 1601 and self-testing assembly 1602. Using the self-testing assembly 1602 a power system operator can ensure that the assembly 1601 will provide protection if a ground fault occurs after the thyristor (or the MOV) has failed to operate.

The assembly 1601 is a system configured to protect power systems from overvoltage events. In some embodiments, the assembly 1601 is attached the transformer neutral line. In some embodiments, the assembly 1601 is a spark gap. In other embodiments, the assembly 1601 is one of the other assemblies disclosed herein.

The self-testing assembly 1602 includes a voltage source 1603, voltage probe 1604, a fuse 1605, and a current probe 1606. Some embodiments do not include the current probe 1606.

The voltage source 1603 is a voltage source capable of generating a high voltage. In some embodiments, the voltage source 1603 is an AC voltage source.

In operation, the voltage source 1603 is used to apply a high voltage but limited current to the assembly 1601 to allow measurement of the breakdown voltage of the assembly 1601. The voltage source 1603 increases the voltage being applied to the assembly 1601 over time. For example, in some embodiments, the voltage is increased over 0.2-0.5 seconds. When the breakdown occurs, only a limited current from the voltage source 1603 will be allowed to flow through the assembly 1601. In some embodiments, this is achieved by using a voltage source 1603 that is not capable of supplying large currents, such as some AC voltage sources.

The breakdown voltage of the spark gap can be determined by monitoring the voltage with the voltage probe 1604 as the voltage is increased to determine the voltage level at which breakdown occurs. In this manner, the operation of the assembly 1601 can be verified and confirmed to meet the specified breakdown voltage requirements. In some embodiments, the determined breakdown voltage is then sent to the power system operator and/or to the supervisory control and data acquisition (SCADA) system.

In the rare case that the assembly 1601 is activated by a power system ground fault, the fuse 1605 opens to protect the voltage source 1603.

In alternate embodiments, the voltage source 1603 is a DC voltage source, which is also configured to increase the voltage over time (e.g., over 0.2-0.5 seconds in some embodiments). In this embodiment, the current probe 1606 monitors the current and deactivates the voltage source 1603 when a current is detected.

Referring to FIGS. 1-16 generally, it is noted that in alternative embodiments, one or more of the features of the arrangement may be excluded. For example, in one possible embodiment, the surge arrester and Jacob's ladder may be integrated. In a further example embodiment, the surge arrester and spark gap could be used in combination, in the absence of the Jacob's ladder configuration extending from the spark gap. In such embodiments, arcs formed in the spark gap can be used to discharge electrical energy, but are not easily carried away from the spark gap once formed. It is further recognized that other implementations of this concept could be developed which in principle employ a set or subset of similar components which are arranged in a parallel electrical connection to provide protection for other components.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:
1. An electrical protection device comprising:
a first electrical connection;
a second electrical connection;
a first electrical discharge device, including:
- a first conductive bus connected to the first electrical connection and a second conductive bus connected to the second electrical connection, the first electrical discharge device forming a first spark gap between a first electrode of the first conductive bus and a second electrode of the second conductive bus, each of the first and second electrodes at least partially constructed from an ablation-resilient material, the first and second electrodes each having a generally cylindrical structure of a predetermined diameter and converging to form the first spark gap, the first spark gap including:
- a breakdown region comprising a vertically-oriented trapezoidal region defined by a gap height, a first gap width, and a second gap width, wherein a difference between the first gap width and the second gap width is less than the predetermined diameter and the gap height is greater than at least the second gap width; and
- a pair of arcing horns extending angularly therefrom,
wherein the breakdown region is formed between a generally vertical region of the first electrode and a generally vertical region of the second electrode, the generally vertical region of the first electrode being defined by a lower corner adjacent to a converging region of the first electrode and an upper corner adjacent to the arcing horn of the first electrode, the generally vertical region of the second electrode being defined by a lower corner adjacent to a converging region of the second electrode and an upper corner adjacent to the arcing horn of the second electrode, a gap between the generally vertical region of the first electrode and the generally vertical region of the second electrode has a gradual linearly decreasing width from a widest point having the first gap width to a narrowest point nearer the pair of arcing horns having the second gap width, the second gap width being selected to form an electrical arc in air at a first breakdown voltage of at least 10,000 volts,
wherein, upon formation of the electrical arc in the first breakdown region, a first electrical current passes between the first electrode and the second electrode and is discharged over a plurality of cycles at a power line frequency across the pair of arcing horns non-destructively; and
a second electrical discharge device, including:
- a third conductive bus connected to the first electrical connection and a fourth conductive bus connected to the second electrical connection,
- the second electrical discharge device forming a second spark gap between a third electrode of the third conductive bus and a fourth electrode of the fourth conductive bus, each of the third and fourth electrodes at least partially constructed from the ablation-resilient material, the second spark gap including:
- a second breakdown region; and
- a second pair of arcing horns extending angularly therefrom,
wherein, in the second breakdown region, a gap between the third electrode and the fourth electrode has a width selected to form an electrical arc in air at a second breakdown voltage of at least 10,000 volts, wherein, upon formation of the electrical arc in the second breakdown region, a second electrical current passes between the third electrode and the fourth electrode and is discharged over a plurality of cycles at a power line frequency across the second pair of arcing horns non-destructively; and
a support structure comprising:
- a plurality of mounts constructed to withstand a Lorentz force generated based on the first electrical current or the second electrical current of at least 60,000 amps during the plurality of cycles at the power line frequency; and
- a plurality of supporting insulator elements rigidly stabilizing the first and second electrical discharge devices and constructed to withstand the Lorentz force.

2. The device of claim 1, wherein the pair of arcing horns includes:
a first conductor including a first end and a second end, the first end connected to the first side of the breakdown region;
a second conductor, including a first end and a second end, the first end connected to the second side of the breakdown region; and
wherein the distance between the second end of the first conductor and the second end of the second conductor is greater than the distance between the first end of the first conductor and the first end of the second conductor.

3. The electrical protection device of claim 1, wherein the first electrical connection is connected to a grounding terminal, and the second electrical connection is connected to a power transmission line or to the neutral of a transformer.

4. The electrical protection device of claim 1, wherein the first and second electrical connections are connected to an electrical system.

5. The electrical protection device of claim 1, wherein the first and second electrical connections are connected to a capacitor bank.

6. The device of claim 1, wherein the first breakdown voltage is above about 10 kV.

7. The device of claim 6, wherein the power line frequency comprises 60 Hz.

8. The device of claim 1, wherein the ablation-resilient material comprises a tungsten alloy.

9. An electrical protection device comprising:
a first electrical connection;
a second electrical connection;
a first spark gap formed between a first electrode and a second electrode, the first and second electrode each having a generally cylindrical structure of a predetermined diameter, the first electrode connected to the first electrical connection and the second electrode connected to the second electrical connection, wherein the first spark gap includes a breakdown region comprising a vertically-oriented trapezoidal region defined by a gap height, a first gap width, and a second gap width, wherein a difference between the first gap width and the second gap width is less than the predetermined diameter and the gap height is greater than at least the second gap width, the second gap width selected to form an electrical arc in air at a first breakdown voltage of at least 10,000 volts, wherein the breakdown region is formed between a generally vertical region of the first electrode and a generally vertical region of the second electrode, the generally vertical region of the first electrode being defined by a lower corner adjacent to a converging region of the first electrode and an upper corner of the first electrode, the generally vertical region of the second electrode being defined by a lower corner adjacent to a converging region of the second electrode and an upper corner of the second electrode, a gap between the generally vertical region of the first electrode and the generally vertical region of the second electrode having a gradual linearly decreasing width from a widest point having the first gap width to a narrowest point having the second gap width nearer the pair of arcing horns;

a first pair of arcing horns extending from the first spark gap and positioned to carry the electrical arc formed at the first spark gap away from the first spark gap over a discharge time duration of a plurality of cycles at a power line frequency non-destructively, wherein the first pair of arcing horns includes a first arcing horn adjacent to the upper corner of the first electrode and a second arcing horn adjacent to the upper corner of the second electrode;

a second spark gap formed between a third electrode and a fourth electrode and having a width selected to form an electrical arc at a second breakdown voltage of at least 10,000 volts, the third electrode connected to the first electrical connection and the fourth electrode connected to the second electrical connection; and a second pair of arcing horns extending from the second spark gap and positioned to carry the electrical arc formed at the second spark gap away from the second spark gap over a discharge time duration of a plurality of cycles at a power line frequency non-destructively.

10. The electrical protection device of claim 9, wherein the first electrical connection is connected to a grounding terminal, and the second electrical connection is connected to a power transmission line or to the neutral of a transformer.

11. The electrical protection device of claim 9, further comprising:
 a first insulating support structure, wherein the first electrode is mounted within the first insulating support structure;
 a second insulating support structure, wherein the second electrode is mounted within the second insulating support structure; and
 an insulating standoff, wherein the insulating standoff is disposed between the first insulating support structure and the second insulating support structure.

12. The electrical protection device of claim 11, further comprising:
 a cylindrical shield, wherein the cylindrical shield surrounds a portion of the insulating standoff and wherein the cylindrical shield does not surround the entire insulating standoff.

13. The electrical protection device of claim 9, further comprising a barrier disposed between the first spark gap and the second spark gap, wherein the barrier is formed from an insulating material.

14. An electrical protection device comprising:
 a first electrical connection;
 a second electrical connection;
 a first spark gap formed between a first electrode and a second electrode, the first and second electrode each having a generally cylindrical structure of a predetermined diameter, the first electrode connected to the first electrical connection and the second electrode connected to the second electrical connection, wherein the first spark gap includes a breakdown region comprising a trapezoidal region defined by a gap height, a first gap width, and a second gap width, wherein a difference between the first gap width and the second gap width is less than the predetermined diameter and the gap height is greater than at least the second gap width, the second gap width being selected to form an electrical arc in at a first breakdown voltage of at least 10,000 volts, wherein the breakdown region is formed between a generally vertical region of the first electrode and a generally vertical region of the second electrode, the generally vertical region of the first electrode being defined by a lower corner adjacent to a converging region of the first electrode and an upper corner of the first electrode, the generally vertical region of the second electrode being defined by a lower corner adjacent to a converging region of the second electrode and an upper corner of the second electrode, a gap between the generally vertical region of the first electrode and the generally vertical region of the second electrode having a gradual linearly decreasing width from a widest point to a narrowest point nearer the pair of arcing horns;

a first Jacob's ladder extending from the first spark gap and positioned to carry the electrical arc formed at the first spark gap away from the first spark gap over a discharge time duration of a plurality of cycles at a power line frequency non-destructively, wherein the first Jacobs's ladder is formed from an upper portion of the first electrode that is adjacent to the upper corner of the first electrode and an upper portion of the second electrode that is adjacent to the upper corner of the second electrode;

a second spark gap formed between a third electrode and a fourth electrode, the third electrode connected to the first electrical connection and the fourth electrode connected to the second electrical connection, wherein the second spark gap has a width selected to form an electrical arc at a second breakdown voltage of at least 10,000 volts;

a second Jacob's ladder extending from the second spark gap and positioned to carry the electrical arc formed at the second spark gap away from the second spark gap over a time duration of a plurality of cycles at a power line frequency non-destructively;

a third spark gap formed between a fifth electrode and a sixth electrode, the fifth electrode connected to the first electrical connection and the sixth electrode connected to the second electrical connection, wherein the third spark gap has a width selected to form an electrical arc at a third breakdown voltage of at least 10,000 volts;

a third Jacob's ladder extending from the third spark gap and positioned to carry an electrical arc formed at the third spark gap away from the third spark gap over a discharge time duration of a plurality of cycles at a power line frequency non-destructively;

wherein the first electrode is separated from the second electrode by a first gap distance corresponding to the first breakdown voltage;

the third electrode is separated from the fourth electrode by a second gap distance corresponding to the second breakdown voltage;

the fifth electrode is separated from the sixth electrode by a third gap distance corresponding to the third breakdown voltage; and wherein the first electrical connection is connected to a grounding terminal, and the second electrical connection is connected to a power transmission line or to the neutral of a transformer.

15. The electrical protection device of claim 14, wherein the difference in gap distance between the narrowest point and the widest point is 0.4 mm.

16. The electrical protection device of claim 14, wherein a first insulator and a second insulator are disposed horizontally to rigidly stabilize the first electrode and the second electrode so as to allow the first electrical discharge device to withstand a Lorentz force generated based on a current through at least one of the first or second spark gaps.

17. The electrical protection device of claim 16, further comprising at least one cylindrical shield disposed around the first insulator to interfere with the formation of a conductive path along the surface of the first insulator.

18. An overvoltage protection system comprising:
an overvoltage protection assembly including:
    a first electrical connection and a second electrical connection;
    a first electrical discharge device, including:
    a first conductive bus connected to the first electrical connection and a second conductive bus connected to the second electrical connection, the first electrical discharge device forming a first spark gap between a first electrode of the first conductive bus and a second electrode of the second conductive bus each at least partially at least partially constructed from an ablation-resilient material, the first and second electrodes converging to form the first spark gap, the first spark gap including:
    a breakdown region; and
    a pair of arcing horns extending angularly therefrom,
    wherein the breakdown region is formed between a generally vertical region of the first electrode and a generally vertical region of the second electrode, the generally vertical region of the first electrode being defined by a lower corner adjacent to a converging region of the first electrode and an upper corner adjacent to the arcing horn of the first electrode, the generally vertical region of the second electrode being defined by a lower corner adjacent to a converging region of the second electrode and an upper corner adjacent to the arcing horn of the second electrode, a gap between the generally vertical region of the first electrode and the generally vertical region of the second electrode has a varying width of between 1 mm and 20 mm that is gradually linearly decreasing from a widest point to a narrowest point nearer the pair of arcing horns and a first breakdown voltage, wherein, when a voltage differential between the first conductive bus and the second conductive bus exceeds the first breakdown voltage, a first electrical current passes between the first conductive bus and the second conductive bus and is discharged over a discharge time duration of a plurality of cycles at a power line frequency non-destructively; and a second electrical discharge device, including a third conductive bus connected to the first electrical connection and a fourth conductive bus connected to the second electrical connection, the second electrical discharge device forming a second spark gap between the third conductive bus and the fourth conductive bus each at least partially constructed from an ablation-resilient material, the second spark gap including:
    a second breakdown region; and
    a second pair of arcing horns extending angularly therefrom,
    wherein, in the breakdown region, a gap between the third conductive bus and the fourth conductive bus has a varying width of between 1 mm and 20 mm and wherein the second electrical discharge device has a second breakdown voltage, wherein, when a voltage differential between the third conductive bus and the fourth conductive bus exceeds the second breakdown voltage, a second electrical current passes between the third conductive bus and the fourth conductive bus and is discharged over a discharge time duration of a plurality of cycles at a power line frequency non-destructively;

a support structure comprising:
    a plurality of mounts constructed to withstand a Lorentz force generated based on a current through at least one of the first or second spark gaps;
    a plurality of supporting insulator elements rigidly stabilizing the first and second electrical discharge devices; and a self-test assembly electrically connected in parallel with the overvoltage protection assembly and useable to detect at least one of the first and second breakdown voltages between an electrical component and ground, wherein the self-test assembly includes a voltage source, a fuse, and a voltage probe.

19. The overvoltage protection system of claim 18, wherein the self-test assembly further includes a current probe.

* * * * *